(12) United States Patent
Asfaw et al.

(10) Patent No.: US 10,178,469 B2
(45) Date of Patent: *Jan. 8, 2019

(54) DAMPING SPRING

(71) Applicant: Google LLC, Mountain View, CA (US)

(72) Inventors: Michael Asfaw, Mountain View, CA (US); Chad Seguin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,227

(22) Filed: Jun. 7, 2016

(65) Prior Publication Data

US 2017/0353784 A1 Dec. 7, 2017

(51) Int. Cl.
| | |
|---|---|
| *H04R 1/28* | (2006.01) |
| *G06F 3/16* | (2006.01) |
| *H04R 1/02* | (2006.01) |
| *H04R 7/16* | (2006.01) |
| *H04R 9/02* | (2006.01) |
| *H04R 9/06* | (2006.01) |
| *H04R 31/00* | (2006.01) |

(52) U.S. Cl.
CPC ............ *H04R 1/2807* (2013.01); *G06F 3/162* (2013.01); *H04R 1/028* (2013.01); *H04R 7/16* (2013.01); *H04R 9/025* (2013.01); *H04R 9/06* (2013.01); *H04R 31/006* (2013.01); *H04R 2460/13* (2013.01)

(58) Field of Classification Search
CPC .............. H04R 2460/13; H04R 25/606; H04R 2225/67; H04R 1/028; H04R 1/1066; H04R 25/30; H04R 5/033; H04R 17/00; H04R 1/00; H04R 1/105; H04R 1/1091; H04R 2201/107; H04R 31/00; H04R 7/045; H04R 9/025; G02C 11/00; G02C 11/06; G02C 11/10
USPC ......................... 381/151, 396, 162, 326, 417
See application file for complete search history.

(56) References Cited

U.S. PATENT DOCUMENTS

| | | | | |
|---|---|---|---|---|
| 2,000,165 | A | * | 5/1935 | Erickson ................ H04R 11/00 381/151 |
| 2,459,325 | A | | 1/1949 | Knowles |
| 2,500,541 | A | | 3/1950 | Greibach |

(Continued)

FOREIGN PATENT DOCUMENTS

WO 2008123667 A1 10/2008

*Primary Examiner* — Matthew Eason
*Assistant Examiner* — Julie X Dang
(74) *Attorney, Agent, or Firm* — McDonnell Boehnen Hulbert & Berghoff LLP

(57) ABSTRACT

Embodiments disclosed in the present disclosure relate to vibration transducers. Such a transducer includes an electromagnet having a conductive coil. The conductive coil is configured to be driven by an electrical input signal to generate magnetic fields. The transducer further includes a magnetic diaphragm that is configured to mechanically vibrate in response to the generated magnetic fields. Additionally, the transducer includes a pair of cantilevered arms formed from damping steel. The cantilevered arms couple the magnetic diaphragm to a frame. The magnetic diaphragm vibrates with respect to the frame when the electromagnet is driven by the electrical input signal. Additionally, the pair of flexible support arms are connected to opposing sides of the magnetic diaphragm.

16 Claims, 14 Drawing Sheets

(56) References Cited

U.S. PATENT DOCUMENTS

| | | |
|---|---|---|
| 4,550,428 A | 10/1985 | Yanagishima et al. |
| 5,624,376 A | 4/1997 | Ball et al. |
| 5,894,263 A | 4/1999 | Shimakawa et al. |
| 6,850,138 B1 | 2/2005 | Sakai |
| 8,965,012 B1 | 2/2015 | Dong et al. |
| 8,989,410 B2 * | 3/2015 | Hebenstreit ............ H04R 1/00 381/151 |
| 9,462,365 B1 | 10/2016 | Dong et al. |
| 9,532,123 B2 | 12/2016 | Fukuda |
| 2002/0039427 A1 | 4/2002 | Whitwell et al. |
| 2006/0115724 A1 | 6/2006 | Buckle et al. |
| 2007/0041595 A1 | 2/2007 | Carazo et al. |
| 2007/0122270 A1 | 5/2007 | Brueckner et al. |
| 2007/0291976 A1 | 12/2007 | Kajiwara |
| 2008/0216578 A1 | 9/2008 | Takashima et al. |
| 2010/0054509 A1 | 3/2010 | Thompson |
| 2010/0110368 A1 * | 5/2010 | Chaum ................ G02B 27/017 351/158 |
| 2012/0020501 A1 | 1/2012 | Lee |
| 2012/0230529 A1 * | 9/2012 | Schumaier .......... H04R 25/606 381/326 |
| 2013/0329918 A1 * | 12/2013 | Kubba ................ G02B 27/017 381/151 |
| 2014/0112503 A1 * | 4/2014 | Hebenstreit ............ H04R 1/00 381/151 |
| 2014/0376751 A1 | 12/2014 | Huang |
| 2015/0141740 A1 * | 5/2015 | Miller ................ H04R 25/606 600/25 |
| 2016/0021452 A1 | 1/2016 | Tang |
| 2016/0192087 A1 | 6/2016 | van Halteren et al. |

* cited by examiner

Oblique view      Cross-Section view

Top View

Cross Section View

Top View

Cross Section View

Cross Section View

DAMPING SPRING

BACKGROUND

Wearable computing devices are becoming increasingly common. Examples of wearable computing devices include head-mountable display devices, smart watches, body-worn health monitors, and smart headphones or headsets.

Bone-conduction transducers vibrate a listener's bone structure (e.g. a person's skull) to provide perceivable audio signals via the inner ear.

SUMMARY

Certain audio devices may be implemented as wearable devices. Audio may be provided from such a wearable device to a wearer using a bone conduction transducer (BCT). Although BCTs may be effective in providing audio, the user may experience buzzing and irritation due to the lack of effective damping of the BCT. The buzzing and irritation may be reduced by replacing springs with springs that use damping steel. Additionally, buzzing and irritation may be reduced by laser welding the damping steel springs using specific parameters.

In one aspect, the present disclosure includes a transducer. The transducer includes an electromagnet having a conductive coil. The conductive coil is configured to be driven by an electrical input signal to generate magnetic fields. The transducer further includes a magnetic diaphragm that is configured to mechanically vibrate in response to the generated magnetic fields. Additionally, the transducer includes a pair of cantilevered arms formed from damping steel. The cantilevered arms couple the magnetic diaphragm to a frame. The magnetic diaphragm vibrates with respect to the frame when the electromagnet is driven by the electrical input signal. Additionally, the pair of flexible support arms are connected to opposing sides of the magnetic diaphragm.

In another aspect, the present disclosure includes a wearable computing system. The wearable computing system includes a support structure, where one or more portions of the support structure are configured to contact a wearer. Additionally, the wearable computing system includes an audio interface for receiving an audio signal. Further, the wearable computing system includes a vibration transducer. The vibration transducer includes an electromagnet having a conductive coil. The conductive coil is configured to be driven by an electrical input signal to generate magnetic fields. The vibration transducer also includes a magnetic diaphragm that is configured to mechanically vibrate in response to the generated magnetic fields. Additionally, the vibration transducer also includes a pair of cantilevered arms formed from damping steel. The cantilevered arms couple the magnetic diaphragm to a frame, and the magnetic diaphragm vibrates with respect to the frame when the electromagnet is driven by the electrical input signal. Further, the pair of flexible support arms are connected to opposing sides of the magnetic diaphragm.

In yet another aspect, the present disclosure includes a method of assembling a vibration transducer. The method includes arranging a first flexible support arm, having a first end and a second end and both formed from damping steel, such that the first end is positioned over a first mounting surface of a magnetic diaphragm. Additionally, the method also includes arranging the first flexible support arm such that the second end is positioned over a first strut or sidewall of a frame of the vibration transducer. Overlapping regions of the first and second ends of the first flexible support arm overlap the first mounting surface of the magnetic diaphragm and the first strut or sidewall of the frame, respectively. The method also includes arranging a second flexible support arm, having a first end and a second end and formed from damping steel, such that the first end is positioned over a second mounting surface of the magnetic diaphragm. The second mounting surface and the first mounting surface are on opposing sides of the magnetic diaphragm. Additionally, the method also includes arranging the second end so it is positioned over a second strut or sidewall of the frame, where overlapping regions of the first and second ends of the second flexible support arm overlap the second mounting surface of the magnetic diaphragm and the second strut or sidewall of the frame, respectively. Further, the method includes laser welding the first and second flexible support arms by directing a laser sufficient to generate heat for laser welding to the respective overlapping regions of the first and second flexible support arms such that one or more laser spot welds are formed to connect the magnetic diaphragm and the frame via the first and second flexible support arms configured to suspend the magnetic diaphragm with respect to the frame.

These as well as other aspects, advantages, and alternatives, will become apparent to those of ordinary skill in the art by reading the following detailed description, with reference where appropriate to the accompanying drawings.

DETAILED DESCRIPTION

Figure 1:
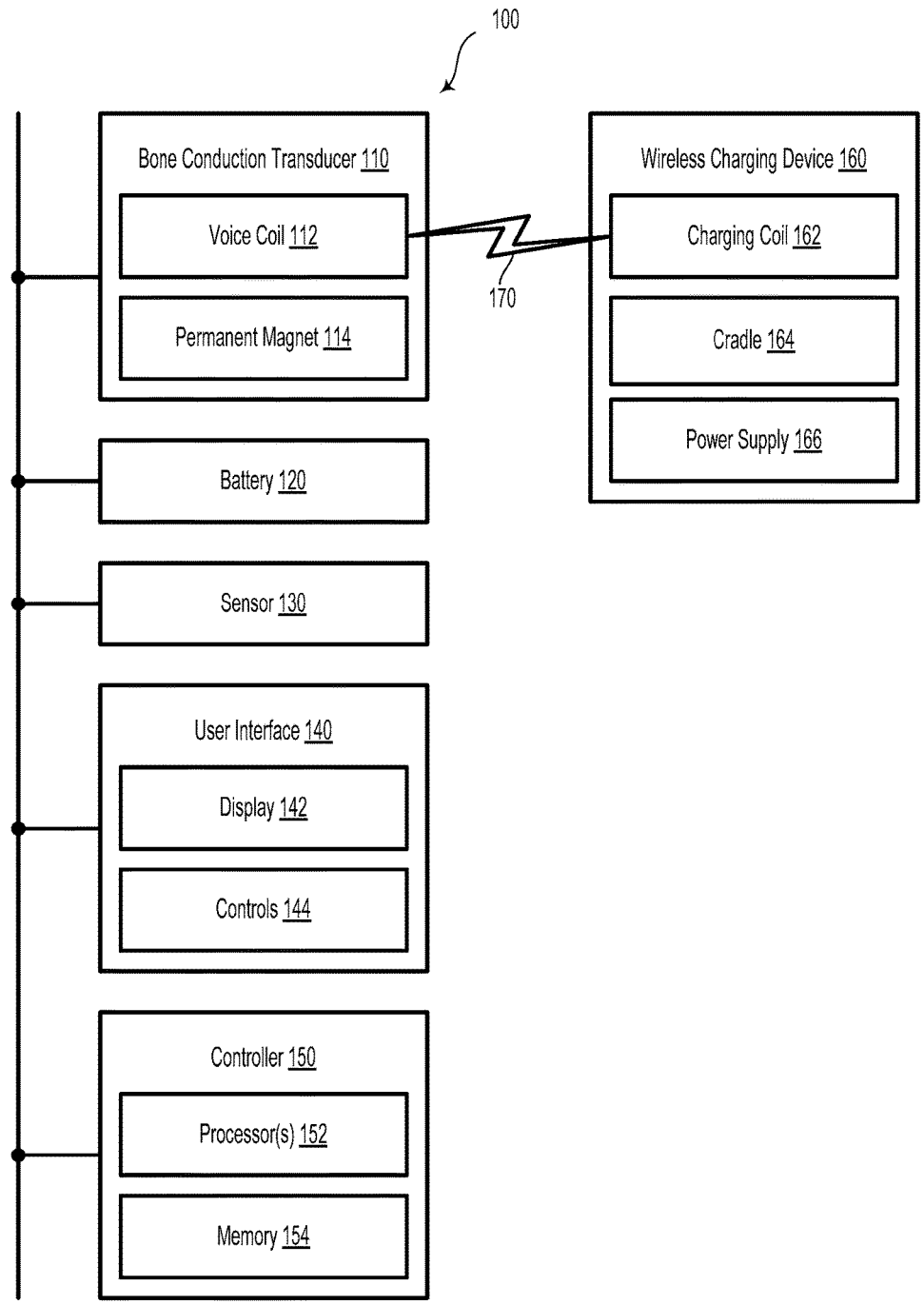
FIG. 1 illustrates a schematic diagram of a system, according to an example embodiment.

Example methods and systems are described herein. It should be understood that the words "example" and "exemplary" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

I. OVERVIEW

Some wearable devices may include a bone-conduction speaker that may take the form of a bone conduction transducer ("BCT"). A BCT may be operable to vibrate the wearer's bone structure at a location where the vibrations travel through the wearer's bone structure to the middle or inner ear, such that the brain interprets the vibrations as sounds. The wearable device may take the form of an earpiece with a BCT, which can be tethered via a wired or wireless interface to a user's phone, or may be a standalone earpiece device with a BCT. Alternatively, the wearable device may be a glasses-style wearable device that includes one or more BCTs and has a form factor that is similar to traditional eyeglasses.

In one case, BCTs use springs that vibrate to conduct sound into the bones. In particular, the springs may be made of a non-magnetic stainless steel material. One characteristic of steel springs, which are commonly used in BCTs, is that steel does not have significant damping characteristic. The lack of damping may cause the user to experience a buzzing and/or irritation sensation when audio is transmitted via the BCT.

An example BCT may provide damping to the springs to reduce this buzzing and/or irritation sensation. The BCT may use a damping steel that provides an adequate damping for the springs. The damping steel may be made of three layers where the outer layers may be stainless steel and the inner layer made from rubbery (or polymer or plastic) damping material. The inclusion of the rubbery damping material may be configured to cause a shift in the resonant frequency of the springs and/or reduce the amplitude of vibrations caused by resonance when the device is operated at or near a resonant frequency. As the damping steel provides the necessary damping, the processing power of the digital signal processor that was previously used for damping purposes (i.e. signal filtering) may be freed up and used for other processing needs that may arise.

II. ILLUSTRATIVE WEARABLE DEVICES

Systems and devices in which exemplary embodiments may be implemented will now be described in greater detail. However, an exemplary system may also be implemented in or take the form of other devices, without departing from the scope of the invention.

An exemplary embodiment may be implemented in a wearable computer having a head-mounted display (HMD), or more generally, may be implemented on any type of device having a glasses-like form factor. Further, an example embodiment involves an ear-piece with a bone-conduction speaker (e.g., a vibration transducer).

The ear-piece may be configured to be attached to a glasses-style support structure, such that when the support structure is worn, the ear-piece extends from the support structure to contact the bone-conduction speaker to the back of the wearer's ear. For instance, the ear-piece may be located on the hook-like section of a side arm, which extends behind a wearer's ear and helps keep the glasses in place. Accordingly, the ear-piece may extend from the side arm to contact the back of the wearer's ear at the auricle, for instance.

In another aspect, the ear-piece may be spring-loaded so that the bone-conduction speaker fits comfortably and securely against the back of the wearer's ear. For instance, the ear-piece may include an extendable member, which is connected to the glasses on one end and is connected to the bone-conduction speaker on the other end. A spring mechanism may accordingly serve to hold the end of the member having the bone conduction away from side-arm when the glasses are not being worn. Further, the spring mechanism may hold the member in a position such that when a wearer puts the glasses on, the back of a wearer's ear (e.g., the auricle) will push against the bone conduction speaker, such that the second end of the member is pushed back towards the side arm (possibly being pressed flush against the sidearm). In this manner, the spring mechanism and member may combine to form a flexible ear-piece, such that when the glasses-style device is worn, the bone-conduction speaker is comfortably pressed against the back of the wearer's ear.

FIG. 1 illustrates a schematic diagram of a system 100, according to an example embodiment. The system 100 includes a BCT 110, a battery 120, an optional sensor 130, an optional user interface 140, and a controller 150.

The BCT 110 includes a voice coil 112 and a permanent magnet 114. The BCT 110 may include a hands-free headset or headphones. Alternatively, BCT 110 may be a bone-anchored hearing aid, an implantable bone conduction device, or another type of assistive listening device. In some embodiments, BCT 110 may include an underwater communication device or another type of listening device. Generally, BCT 110 may include a device operable to stimulate auditory sensations via one or more of distortional bone-conduction, inertial bone-conduction, or osseotympanic bone-conduction. As used herein, BCT 110 may refer to a single transducer (e.g., for mono listening), two transducers (e.g., for stereo listening), or more transducers. Furthermore, although the term "bone conduction" is used with respect to BCT 110, it is understood that BCT 110 may relate to a variety of transducers configured to convey sound fully or partially through contact with a body, through bone or other structures such as cartilage.

Voice coil 112 may include insulated wire, also known as magnet wire, wrapped in a simple coil or a toroid shape. In the case of a simple coil, the insulated wire may be wrapped around a cylindrical core that may include air, plastic, or a ferromagnetic material. In the case of a toroid shape, the insulated wire may be wrapped around a ring- or donut-shaped core of plastic or ferromagnetic material. Other wire wrapping geometries are contemplated. In an example embodiment, voice coil 112 may include a turn radius of approximately 2 mm. Voice coil 112 may include copper wire with a phenolic resin (enamel) coating. For example, the coating may include a polyvinyl acetal-phenol aldehyde resin or other similar materials. Other types of electrically-insulating coatings are possible, such as polyimide, polyester, or polyvinyl formal. In an example embodiment, voice coil 112 may include wire having a diameter of about 90 microns (e.g., AWG 39 or SWG 43), however other wire thicknesses and corresponding wire gauges are contemplated.

Voice coil 112 may be considered an inductor, or a device configured to resist changes in electrical current passing through it. Voice coil 112 may include a characteristic inductance L, which is equivalent to the ratio of the voltage to the rate of change of current, $$L = v(t) \bigg/ \frac{di(t)}{dt},$$

where v(t) is the time-varying voltage across voice coil 112 and i(t) is the time-varying current through voice coil 112. The inductance of voice coil 112 may be expressed in units of a Henry (H).

In an example embodiment, the inductance of voice coil 112 may be greater than 1 milliHenry (mH) with an impedance of 8 ohms (Ω). As such, in some embodiments, voice coil 112 may generally have a larger inductance than other types of voice coils, such as those in speakers, ear buds, microspeakers, etc. Other inductance values are possible for voice coil 112.

Permanent magnet 114 may include one or more ferromagnetic materials such as iron, cobalt, nickel, rare earth metals, etc. In an example embodiment, permanent magnet 114 may include alnico, ferrite, or neodymium-iron-boron (NIB). Other magnetic materials are contemplated.

In an example embodiment, the inductance of voice coil 112 may be controlled by, for example, adjusting its position with respect to a pole piece and/or permanent magnet 114.

BCT 110 may include other elements, such as a yoke, a housing, an armature coupled to permanent magnet 114 and/or the housing, one or more springs or damping devices coupled to the armature and/or the housing, and electrical connections to voice coil 112.

Battery 120 may include a secondary (rechargeable) battery. Among other possibilities, battery 120 may include one or more of a nickel-cadmium (NiCd) cell, a nickel-zinc (NiZn) cell, a nickel metal hydride (NiMH) cell, or a lithium-ion (Li-ion) cell. Battery 120 may be operable to provide electrical power for BCT 110 and other elements of system 100. In an example embodiment, battery 120 may be electrically coupled to a battery charging circuit.

Optional sensor 130 may be configured to determine a state of, and/or a position of, system 100. As such, the sensor may include a don/doff sensor, a proximity sensor, or a Hall Effect sensor. Other types of sensors are contemplated. In an example embodiment, sensor 130 may provide information that may be used to determine an operating mode of system 100. In other words, sensor 130 may provide signals that may be used to switch system 100 from a first operating mode to a second operating mode, or vice versa.

User interface 140 may include an optional display 142 and controls 144. Display 142 may be configured to provide images to a user of system 100. In an example embodiment, display 142 may be at least partially see-through so that a user may view at least a portion of the environment by looking through display 142. In such a scenario, display 142 may provide images overlaid on the field of view of the environment. In some embodiments, display 142 may be configured to provide the user with an augmented reality or a virtual reality experience.

Controls 144 may include any combination of switches, buttons, touch-sensitive surfaces, and/or other user input devices. A user may monitor and/or adjust the operation of system 100 via controls 144. In an example embodiment, the controls 144 may be used to trigger one or more of the operations described herein.

System 100 may optionally include a communication interface (not illustrated) that may allow system 100 to communicate, using analog or digital modulation, with other devices, access networks, and/or transport networks. Specifically, the communication interface may be configured to communicate with a battery charging device 160, as described elsewhere herein. In some embodiments, the communication interface may facilitate circuit-switched and/or packet-switched communication, such as plain old telephone service (POTS) communication and/or Internet protocol (IP) or other packetized communication. For instance, the communication interface may include a chipset and antenna arranged for wireless communication with a radio access network or an access point. Also, the communication interface may take the form of or include a wireline interface, such as an Ethernet, Universal Serial Bus (USB), or High-Definition Multimedia Interface (HDMI) port. The communication interface may also take the form of or include a wireless interface, such as a Wifi, BLUETOOTH®, BLUETOOTH LOW ENERGY®, global positioning system (GPS), or wide-area wireless interface (e.g., WiMAX or 3GPP Long-Term Evolution (LTE)). However, other forms of physical layer interfaces and other types of standard or proprietary communication protocols may be used over the communication interface. Furthermore, the communication interface may include multiple physical communication interfaces (e.g., a Wifi interface, a BLUETOOTH® interface, and a wide-area wireless interface).

In an example embodiment, system 100 may include a communication interface configured operate according to a near field magnetic induction (NFMI) communication protocol. In such a scenario, voice coil 112 or another coil associated with system 100 may be configured to transmit or receive a signal that may take the form of a modulated magnetic field. Namely, the NFMI protocol may provide for communications between devices within a near-field distance (e.g., less than 2 meters). In an example embodiment, the communications may represent a short-range link between system 100 and wireless charging device 160. For example, system 100 may emit a periodic handshake request via NFMI. If wireless charging device 160 responds, system 100 may begin operating in a wireless charging mode, as the response may indicate that the two devices are in close proximity to one another. The NFMI communication protocol may include a 13.56 MHz carrier frequency; however other carrier frequencies are possible. Furthermore, due to the relatively short communication range, NFMI communications may be more secure than other communications methods that may involve propagating "far-field" communications.

Controller 150 may include one or more processor(s) 152 and a memory 154, such as a non-transitory computer readable medium. Controller 150 may include at least one processor 152 and a memory 154. Processor 152 may include one or more general purpose processors—e.g., microprocessors—and/or one or more special purpose processors—e.g., image signal processors (ISPs), digital signal processors (DSPs), graphics processing units (GPUs), floating point units (FPUs), network processors, or application-specific integrated circuits (ASICs). In an example embodiment, controller 150 may include one or more audio signal processing devices or audio effects units. Such audio signal processing devices may process signals in analog and/or digital audio signal formats. Additionally or alternatively, processor 152 may include at least one programmable in-circuit serial programming (ICSP) microcontroller. Memory 154 may include one or more volatile and/or non-volatile storage components, such as magnetic, optical, flash, or organic storage, and may be integrated in whole or in part with the processor 152. Memory 154 may include removable and/or non-removable components.

Processor 152 may be capable of executing program instructions (e.g., compiled or non-compiled program logic and/or machine code) stored in memory 154 to carry out the various functions described herein. Therefore, memory 154 may include a non-transitory computer-readable medium, having stored thereon program instructions that, upon execution by computing device 100, cause computing device 100 to carry out any of the methods, processes, or operations disclosed in this specification and/or the accompanying drawings. The execution of program instructions by processor 152 may result in processor 152 using data provided by various other elements of the computing device 100. In an example embodiment, the controller 150 may include a distributed computing network and/or a cloud computing network.

In an example embodiment, controller 150 and processor 152 may operate system 100 in a first operating mode. The first operating mode may include, for example, driving the voice coil with an audio signal. That is, the first operating mode may include operating system 100 and voice coil 112 so as to provide an auditory sensory experience for a user.

Controller 150 and processor 152 may operate system 100 in a second operating mode. In such a scenario, the second operating mode may include wirelessly charging battery 120, via a resonant or inductive coupling link between voice coil 112 and a charging coil 162 of a wireless charging device 160. That is, the second operating mode may include transferring energy from a power supply 166 of the wireless charging device 160 to the battery 120 via a resonant or inductive coupling link 170 between the voice coil 112 and the charging coil 162.

In an example embodiment, wireless charging device 160 may include a cradle 164. In such a scenario, a housing of system 100 is shaped to engage at least a portion of the cradle 164 while wirelessly charging battery 120. Wireless charging device 160 may take the form of, or be incorporated into, a charging pad, a table, a desk, a wall, a piece of furniture, a lighting fixture, a repositionable mount, a bare transmitter coil, among other possibilities. In an example embodiment, while charging, system 100 may rest at least partially within cradle 164. Alternatively, the system 100 may rest on, or hang from, cradle 164 while charging.

In an example embodiment, the operations may include determining whether system 100 is within a predetermined distance from wireless charging device 160. In an example embodiment, the predetermined distance may include a distance at which a charging or coupling efficiency between voice coil 112 and charging coil 162 becomes greater than a threshold coupling efficiency. For example, the threshold coupling efficiency may be 20% coupling efficiency. Thus, the predetermined distance may relate to a distance at which 20% of the energy transmitted by the wireless charging device 160 is received by the system 100. Alternatively or additionally, the predetermined distance may relate to a given distance, such as 1 centimeter, 10 centimeters, 1 meter, 10 meters, etc. Upon determining that system 100 is within the predetermined distance from wireless charging device 160, the operations may include switching from a first operation mode (normal BCT listening mode) and a second operation mode (wireless charging mode). Conversely, if the determination is that system 100 is not within the predetermined distance, the operations may include switching from the second operation mode to the first operation mode.

In some embodiments, the distance determination may be made based on information received from sensor 130. For example, in the case where the sensor is a proximity sensor, the proximity sensor may provide information indicative of the distance between system 100 and wireless charging device 160.

Controller 150 and processor 152 may switch system 100 from the first operating mode to the second operating mode or vice versa based on receiving various signals. For example, the system 100 or the cradle 164 may include a microswitch. In such a scenario, when the microswitch is engaged (e.g., physically depressed), the controller 150 may receive a signal indicative of the microswitch being engaged. In response to such a signal, controller 150 may switch from operating system 100 in the first operating mode to operating it in the second operating mode.

Additionally or alternatively, system 100 may switch between the first operating mode and the second operating mode based on information received via a communication link, such as the communication interface described above. For example, system 100 and wireless charging device 160 may include respective communication devices. As such, the respective communication devices may be configured to communicate with one another via a wireless communication link. The information received via the wireless communication link may include a signal strength, which may be indicative of a relative distance between system 100 and wireless charging device 160. The communications may additionally or alternatively include relative or absolute position information of one or both of system 100 or the wireless charging device 160. In an example embodiment, the information transferred via the wireless communication link may accord to a BLUETOOTH or BLUETOOTH LOW ENERGY communication protocol. Other wireless communication protocols are contemplated.

System 100 may switch between the first operating mode and the second operating mode based on recognizing a characteristic condition of being near, or docked with, wireless charging device 160. For example, wireless charging device 160 may include one or more characteristic magnets. That is, wireless charging device 160 may include magnets in a characteristic spatial arrangement or having characteristic magnetic properties (e.g., magnetic field strength). In such a scenario, sensor 130 may include a magnetic sensor configured to detect the characteristic magnet(s). That is, system 100 may switch between the first operation mode and the second operation mode based on receiving, from the magnetic sensor, information indicative of the characteristic magnet(s).

While in the second operating mode, energy may transferred from wireless charging device 160 to system 100 via inductive or resonant coupling link 170. The energy may be transferred using various charging signals. In an example embodiment, the charging signal may include an alternating current (AC) signal comprising a frequency greater than 20,000 Hertz (Hz). Charging signals that include other frequencies or one or more frequency waveband ranges are contemplated.

Figure 2A:
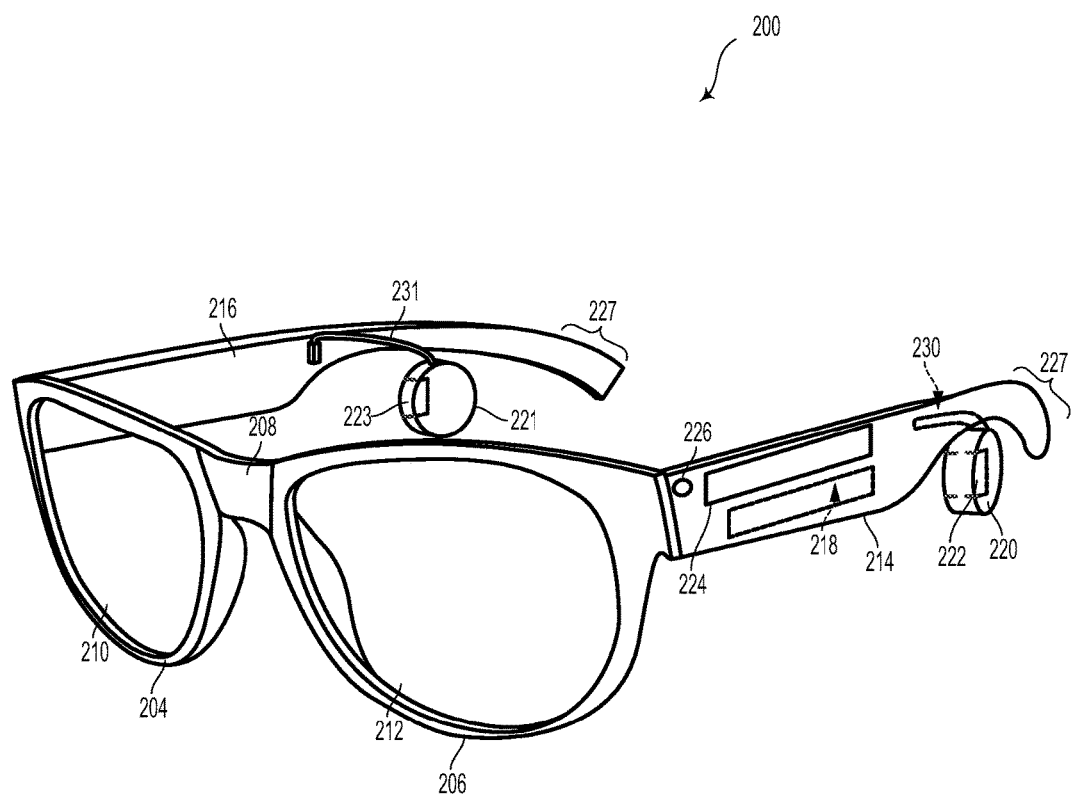
FIG. 2A illustrates a wearable device, according to example embodiments.
Figure 2B:
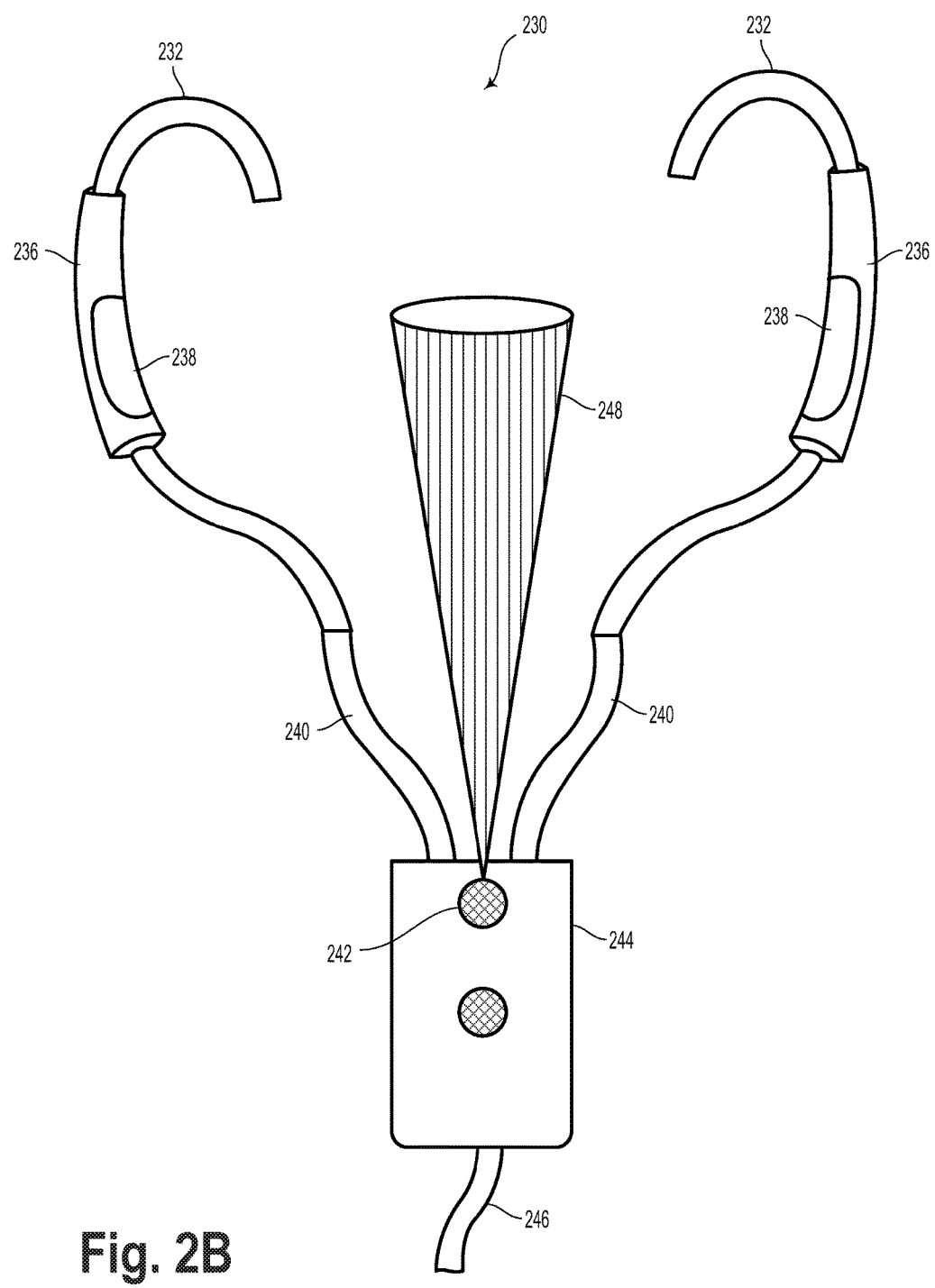
FIG. 2B illustrates a wearable device, according to example embodiments.
Figure 2C:
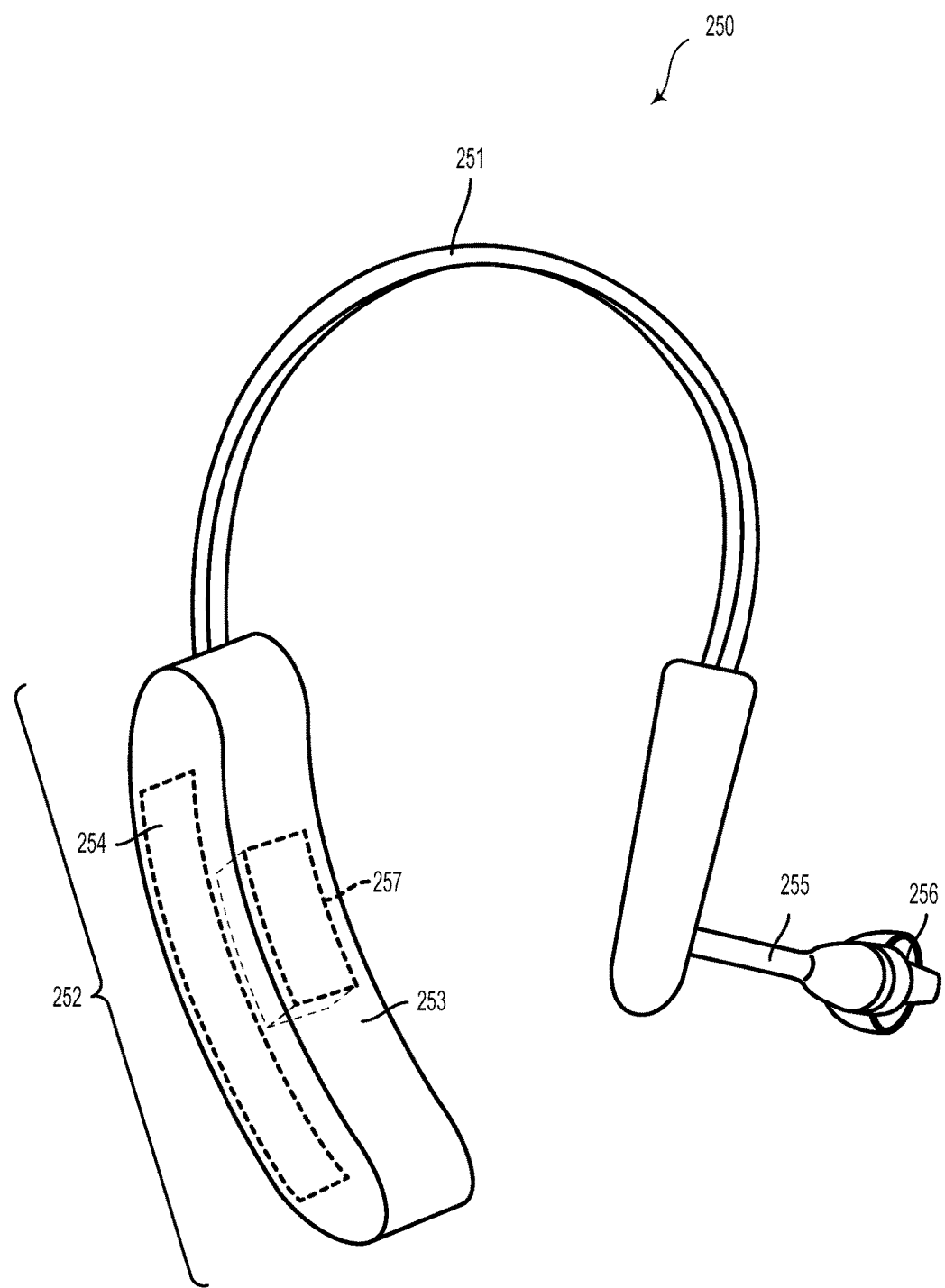
FIG. 2C illustrates a wearable device, according to example embodiments

FIGS. 2A-2C illustrate several non-limiting examples of wearable devices as contemplated in the present disclosure. As such, system 100 as illustrated and described with respect to FIG. 1 may take the form of any of wearable devices 200, 230, or 250. The system 100 may take other forms as well.

FIG. 2A illustrates a wearable device 200, according to an example embodiment. Wearable device 200 may be shaped similar to a pair of glasses or another type of head-mountable device. As such, wearable device 200 may include frame elements including lens-frames 204, 206 and a center frame support 208, lens elements 210, 212, and extending side-arms 214, 216. The center frame support 208 and the extending side-arms 214, 116 are configured to secure the wearable device 200 to a user's head via placement on a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the wearable device 200. Other materials are possible as well. Each of the lens elements 210, 212 may also be sufficiently transparent to allow a user to see through the lens element.

Additionally or alternatively, the extending side-arms 214, 216 may be positioned behind a user's ears to secure the wearable device 200 to the user's head. The extending side-arms 214, 216 may further secure the wearable device 200 to the user by extending around a rear portion of the user's head. Additionally or alternatively, for example, the wearable device 200 may connect to or be affixed within a head-mountable helmet structure. Other possibilities exist as well.

Wearable device 200 may also include an on-board computing system 218 and at least one finger-operable touch pad 224. The on-board computing system 218 is shown to be integrated in side-arm 214 of wearable device 200. However, an on-board computing system 218 may be provided on or within other parts of the wearable device 200 or may be positioned remotely from, and communicatively coupled to, a head-mountable component of a computing device (e.g., the on-board computing system 218 could be housed in a separate component that is not head wearable, and is wired or wirelessly connected to a component that is head wearable). The on-board computing system 218 may include a processor and memory, for example. Further, the on-board computing system 218 may be configured to receive and analyze data from a finger-operable touch pad 224 (and possibly from other sensory devices and/or user interface components).

In a further aspect, wearable device 200 may include various types of sensors and/or sensory components. For instance, wearable device 200 could include an inertial measurement unit (IMU) (not explicitly illustrated in FIG. 2A), which provides an accelerometer, gyroscope, and/or magnetometer. In some embodiments, wearable device 200 could also include an accelerometer, a gyroscope, and/or a magnetometer that is not integrated in an IMU.

In a further aspect, wearable device 200 may include sensors that facilitate a determination as to whether or not the wearable device 200 is being worn. For instance, sensors such as an accelerometer, gyroscope, and/or magnetometer could be used to detect motion that is characteristic of wearable device 200 being worn (e.g., motion that is characteristic of user walking about, turning their head, and so on), and/or used to determine that the wearable device 200 is in an orientation that is characteristic of the wearable device 200 being worn (e.g., upright, in a position that is typical when the wearable device 200 is worn over the ear). Accordingly, data from such sensors could be used as input to an on-head detection process. Additionally or alternatively, the wearable device 200 may include a capacitive sensor or another type of sensor that is arranged on a surface of the wearable device 200 that typically contacts the wearer when the wearable device 200 is worn. Accordingly, data provided by such a sensor may be used to determine whether the wearable device 200 is being worn. Other sensors and/or other techniques may also be used to detect when the wearable device 200 is being worn.

The wearable device 200 also includes at least one microphone 226, which may allow the wearable device 200 to receive voice commands from a user. The microphone 226 may be a directional microphone or an omni-directional microphone. Further, in some embodiments, the wearable device 200 may include a microphone array and/or multiple microphones arranged at various locations on the wearable device 200.

In FIG. 2A, touch pad 224 is shown as being arranged on side-arm 214 of the wearable device 200. However, touch pad 224 may be positioned on other parts of the wearable device 200. Also, more than one touch pad may be present on the wearable device 200. For example, a second touchpad may be arranged on side-arm 216. Additionally or alternatively, a touch pad may be arranged on a rear portion 227 of one or both side-arms 214 and 216. In such an arrangement, the touch pad may arranged on an upper surface of the portion of the side-arm that curves around behind a wearer's ear (e.g., such that the touch pad is on a surface that generally faces towards the rear of the wearer, and is arranged on the surface opposing the surface that contacts the back of the wearer's ear). Other arrangements including one or more touch pads are also possible.

Touch pad 224 may sense contact, proximity, and/or movement of a user's finger on the touch pad via capacitive sensing, resistance sensing, or a surface acoustic wave process, among other possibilities. In some embodiments, touch pad 224 may be a one-dimensional or linear touchpad, which is capable of sensing touch at various points on the touch surface, and of sensing linear movement of a finger on the touch pad (e.g., movement forward or backward along the touch pad 224). In other embodiments, touch pad 224 may be a two-dimensional touch pad that is capable of sensing touch in any direction on the touch surface. Additionally, in some embodiments, touch pad 224 may be configured for near-touch sensing, such that the touch pad can sense when a user's finger is near to, but not in contact with, the touch pad. Further, in some embodiments, touch pad 224 may be capable of sensing a level of pressure applied to the pad surface.

In a further aspect, earpiece 220 and 211 are attached to side-arms 214 and 216, respectively. Earpieces 220 and 221 may each include a BCT 222 and 223, respectively. BCT 222 and 223 may be similar or identical to BCT 110 as illustrated and described in reference to FIG. 1. Each earpiece 220, 221 may be arranged such that when the wearable device 200 is worn, each BCT 222, 223 is positioned to the posterior of a wearer's ear. For instance, in an exemplary embodiment, an earpiece 220, 221 may be arranged such that a respective BCT 222, 223 can contact the auricle of both of the wearer's ears and/or other parts of the wearer's head. Other arrangements of earpieces 220, 221 are also possible. Further, embodiments with a single earpiece 220 or 221 are also possible.

In an exemplary embodiment, BCT 222 and/or BCT 223 may operate as a bone-conduction speaker. BCT 222 and 223 may be, for example, a vibration transducer, an electroacoustic transducer, or a variable reluctance transducer that produces sound in response to an electrical audio signal input. Generally, a BCT may be any structure that is operable to directly or indirectly vibrate the bone structure or pinnae of the user. For instance, a BCT may be implemented with a vibration transducer that is configured to receive an audio signal and to vibrate a wearer's bone structure or pinnae in accordance with the audio signal.

As illustrated in FIG. 2A, wearable device 200 need not include a graphical display. However, in some embodiments, wearable device 200 may include such a display. In particular, the wearable device 200 may include a near-eye display (not explicitly illustrated). The near-eye display may be coupled to the on-board computing system 218, to a stand-alone graphical processing system, and/or to other components of the wearable device 200. The near-eye display may be formed on one of the lens elements of the wearable device 200, such as lens element 210 and/or 212. As such, the wearable device 200 may be configured to overlay computer-generated graphics in the wearer's field of view, while also allowing the user to see through the lens element and concurrently view at least some of their real-world environment. In other embodiments, a virtual reality display that substantially obscures the user's view of the surrounding physical world is also possible. The near-eye display may be provided in a variety of positions with respect to the wearable device 200, and may also vary in size and shape.

Other types of near-eye displays are also possible. For example, a glasses-style wearable device may include one or more projectors (not illustrated) that are configured to project graphics onto a display on a surface of one or both of the lens elements of the wearable device 200. In such a configuration, the lens element(s) of the wearable device 200 may act as a combiner in a light projection system and may include a coating that reflects the light projected onto them from the projectors, towards the eye or eyes of the wearer. In other embodiments, a reflective coating need not be used (e.g., when the one or more projectors take the form of one or more scanning laser devices).

As another example of a near-eye display, one or both lens elements of a glasses-style wearable device could include a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame of the wearable device 200 for driving such a matrix display. Alternatively or additionally, a laser or LED source and scanning system could be used to draw a raster display directly onto the retina of one or more of the user's eyes. Other types of near-eye displays are also possible.

FIG. 2B illustrates a wearable device 230, according to an example embodiment. The device 230 includes two frame portions 232 shaped so as to hook over a wearer's ears. When worn, a behind-ear housing 236 is located behind each of the wearer's ears. The housings 236 may each include a BCT 238. BCT 238 may be similar or identical to BCT 110 as illustrated and described with regard to FIG. 1. BCT 238 may be, for example, a vibration transducer or an electro-acoustic transducer that produces sound in response to an electrical audio signal input. As such, BCT 238 may function as a bone-conduction speaker that plays audio to the wearer by vibrating the wearer's bone structure. Other types of BCTs are also possible. Generally, a BCT may be any structure that is operable to directly or indirectly vibrate the bone structure of the user.

Note that the behind-ear housing 236 may be partially or completely hidden from view, when the wearer of the device 230 is viewed from the side. As such, the device 230 may be worn more discreetly than other bulkier and/or more visible wearable computing devices.

As illustrated in FIG. 2B, BCT 238 may be arranged on or within the behind-ear housing 236 such that when the device 230 is worn, BCT 238 is positioned posterior to the wearer's ear, in order to vibrate the wearer's bone structure. More specifically, BCT 238 may form at least part of, or may be vibrationally coupled to the material that forms the behind-ear housing 236. Further, the device 230 may be configured such that when the device is worn, the behind-ear housing 236 is pressed against or contacts the back of the wearer's ear. As such, BCT 238 may transfer vibrations to the wearer's bone structure or pinnae via the behind-ear housing 236. Other arrangements of a BCT on device 230 are also possible.

In some embodiments, behind-ear housing 236 may include a touchpad (not shown), similar to touchpad 224 shown in FIG. 2A and described above. Further, the frame 232, behind-ear housing 236, and BCT 238 configuration shown in FIG. 2B may be replaced by ear buds, over-ear headphones, or another type of headphones or micro-speakers. These different configurations may be implemented by removable (e.g., modular) components, which can be attached and detached from the device 230 by the user. Other examples are also possible.

In FIG. 2B, device 230 includes two cords 240 extending from frame portions 232. The cords 240 may be more flexible than the frame portions 232, which may be more rigid in order to remain hooked over the wearer's ears during use. The cords 240 are connected at a pendant-style housing 244. The housing 244 may contain, for example, one or more microphones 242, a battery, one or more sensors, a processor, a communications interface, and onboard memory, among other possibilities.

A cord 246 extends from the bottom of housing 244, which may be used to connect device 230 to another device, such as a portable digital audio player, a smartphone, among other possibilities. Additionally or alternatively, the device 230 may communicate with other devices wirelessly, via a communications interface located in, for example, the housing 244. In this case, the cord 246 may be removable cord, such as a charging cable.

Microphones 242 included in housing 244 may be omni-directional microphones or directional microphones. Further, an array of microphones could be implemented. In the illustrated embodiment, the device 230 includes two microphones arranged specifically to detect speech by the wearer of the device. For example, the microphones 242 may direct a listening beam 248 toward a location that corresponds to a wearer's mouth, when the device 230 is worn. The microphones 242 may also detect sounds in the wearer's environment, such as the ambient speech of others in the vicinity of the wearer. Additional microphone configurations are also possible, including a microphone arm extending from a portion of the frame 232, or a microphone located inline on one or both of the cords 240. Other possibilities for providing information indicative of a local acoustic environment are contemplated herein.

FIG. 2C illustrates a wearable device 250, according to an example embodiment. Wearable device 250 includes a frame 251 and a behind-ear housing 252. As shown in FIG. 2C, the frame 251 is curved, and is shaped so as to hook over a wearer's ear. When hooked over the wearer's ear(s), the behind-ear housing 252 is located behind the wearer's ear. For example, in the illustrated configuration, the behind-ear housing 252 is located behind the auricle, such that a surface 253 of the behind-ear housing 252 contacts the wearer on the back of the auricle.

Note that the behind-ear housing 252 may be partially or completely hidden from view, when the wearer of wearable device 250 is viewed from the side. As such, the wearable device 250 may be worn more discreetly than other bulkier and/or more visible wearable computing devices.

Wearable device 250 and behind-ear housing 252 may include one or more BCTs, such as the BCT 222 as illustrated and described with regard to FIG. 2A or BCT 110 as illustrated and described with regard to FIG. 1. The one or more BCTs may be arranged on or within behind-ear housing 252 such that when wearable device 250 is worn, the one or more BCTs may be positioned posterior to the wearer's ear, in order to vibrate the wearer's bone structure. More specifically, the one or more BCTs may form at least part of, or may be vibrationally coupled to the material that forms, surface 253 of behind-ear housing 252. Further, wearable device 250 may be configured such that when the device is worn, surface 253 is pressed against or contacts the back of the wearer's ear. As such, the one or more BCTs may transfer vibrations to the wearer's bone structure or pinnae via surface 253. Other arrangements of a BCT on an earpiece device are possible.

Furthermore, wearable device 250 may include a touch-sensitive surface 254, such as touchpad 224 as illustrated and described in reference to FIG. 2A. Touch-sensitive surface 254 may be arranged on a surface of wearable device 250 that curves around behind a wearer's ear (e.g., such that the touch-sensitive surface generally faces towards the wearer's posterior when the earpiece device is worn). Other arrangements of touch-sensitive surface 254 are possible.

Wearable device 250 also includes a microphone arm 255, which may extend towards a wearer's mouth, as shown in FIG. 2C. Microphone arm 255 may include a microphone 256 that is distal from the earpiece. Microphone 256 may be an omni-directional microphone or a directional microphone. Further, an array of microphones could be implemented on a microphone arm 255. Alternatively, a bone conduction microphone (BCM) could be implemented on a microphone arm 255. In such an embodiment, the arm 255 may be operable to locate and/or press a BCM against the wearer's face near or on the wearer's jaw, such that the BCM vibrates in response to vibrations of the wearer's jaw that occur when they speak. Note that the microphone arm 255 is optional. Furthermore, other microphone configurations are possible.

III. ILLUSTRATIVE COMPUTING DEVICES

Figure 3:
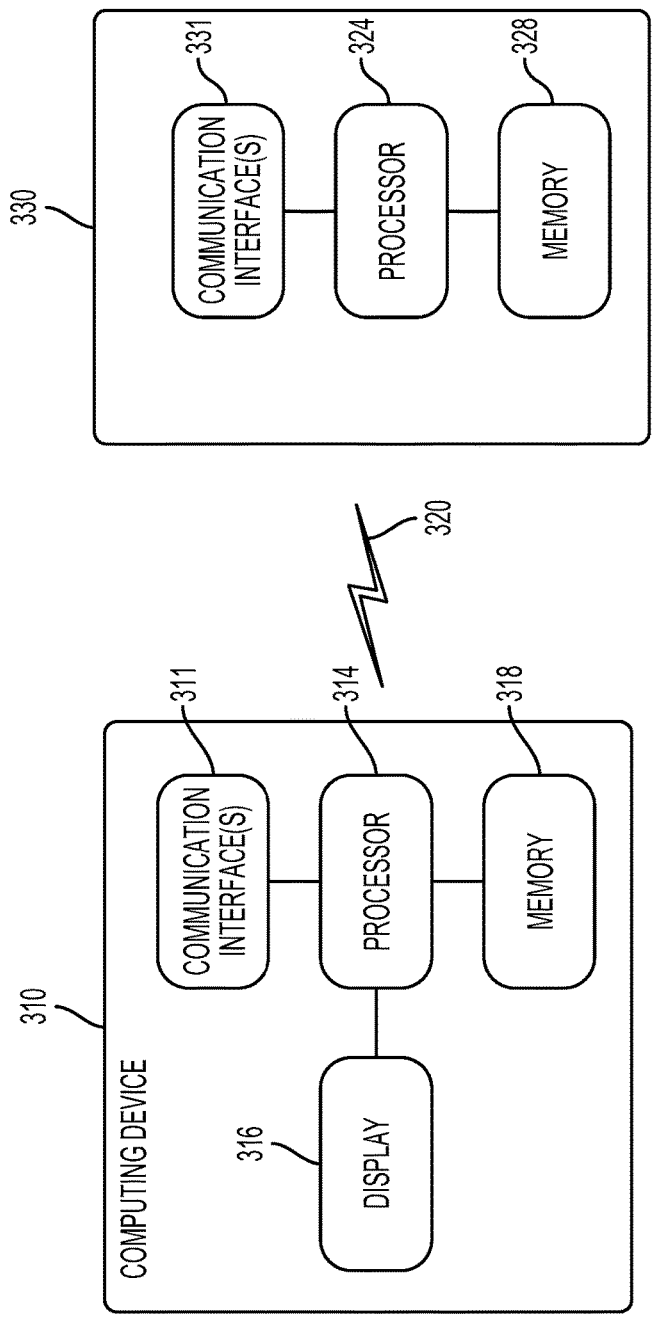
FIG. 3 illustrates a block diagram showing components of a computing device and a wearable computing device, according to an example embodiment.
Figure 4A:
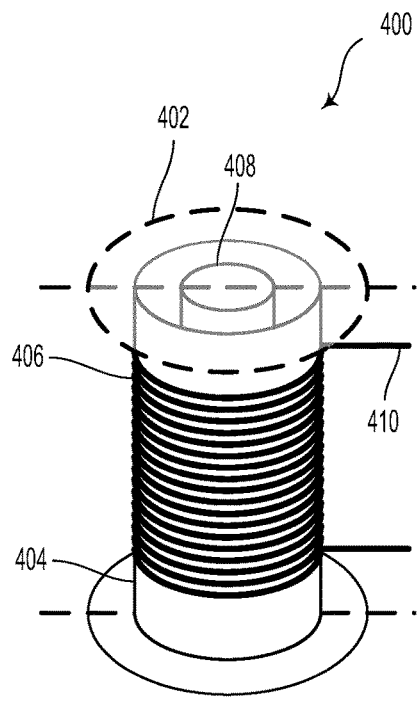
FIG. 4A illustrates a voice coil and a permanent magnet scenario, according to an example embodiment.
Figure 4A:
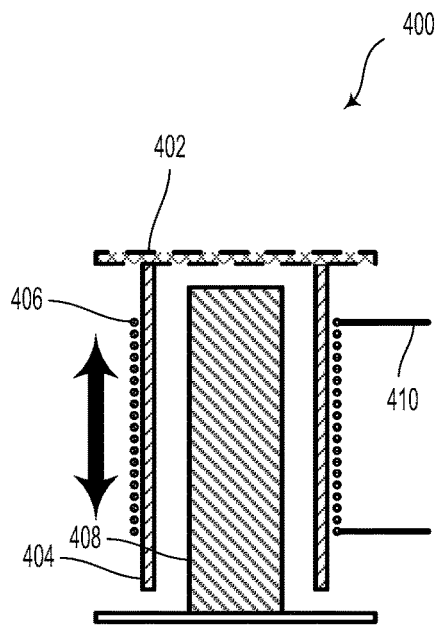
Figure 4B:
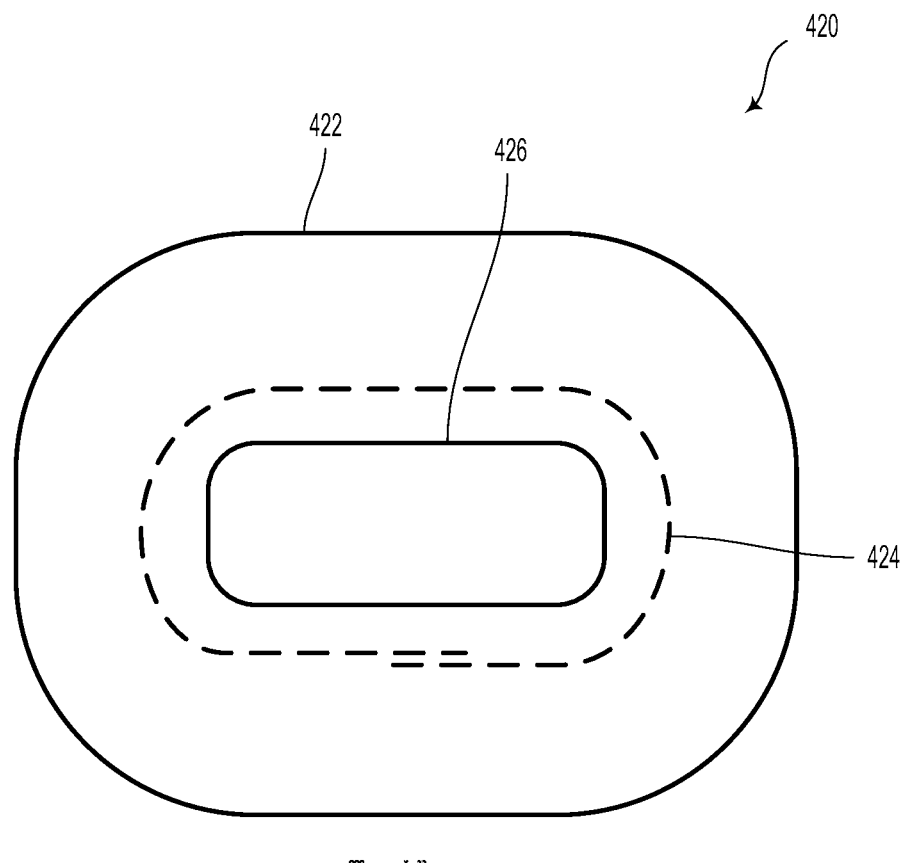
FIG. 4B illustrates a voice coil, according to an example embodiment.
Figure 4B:
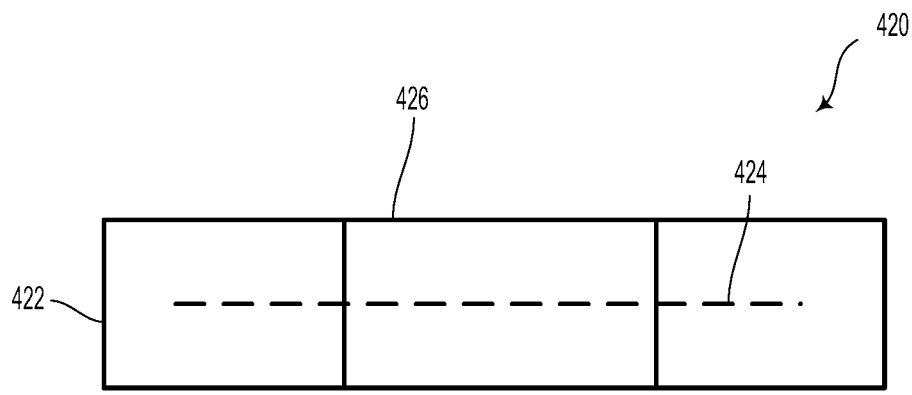
Figure 4C:
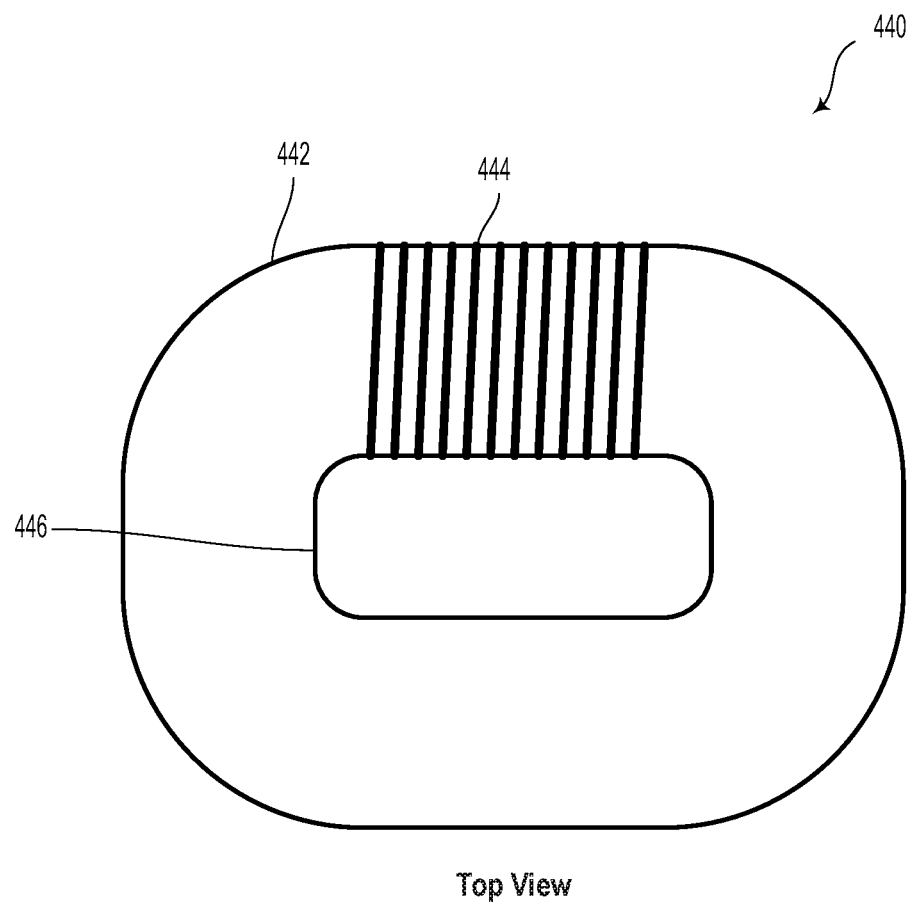
FIG. 4C illustrates a voice coil, according to an example embodiment.
Figure 4C:
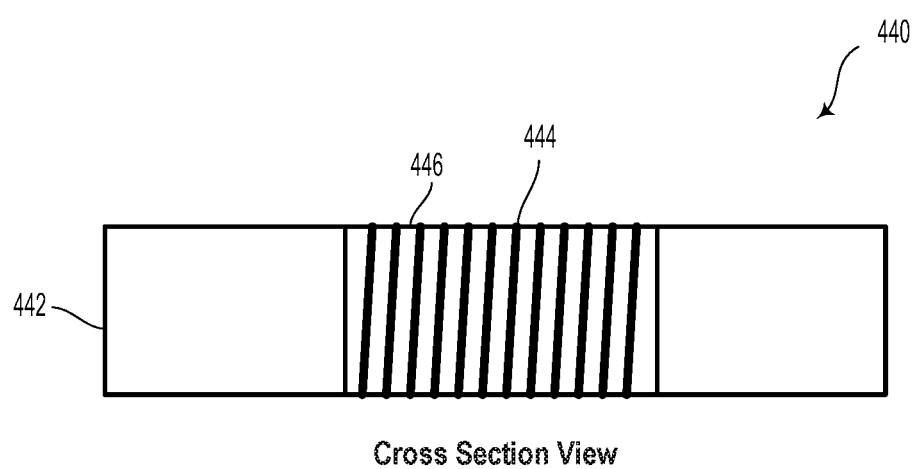
Figure 4D:
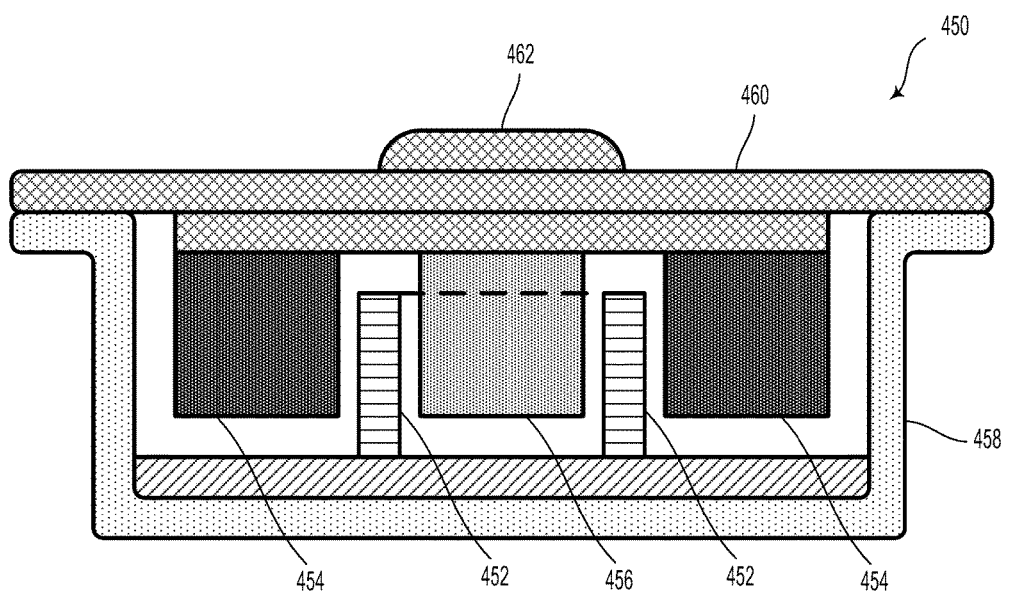
FIG. 4D illustrates a bone conduction transducer, according to an example embodiment.
Figure 4E:
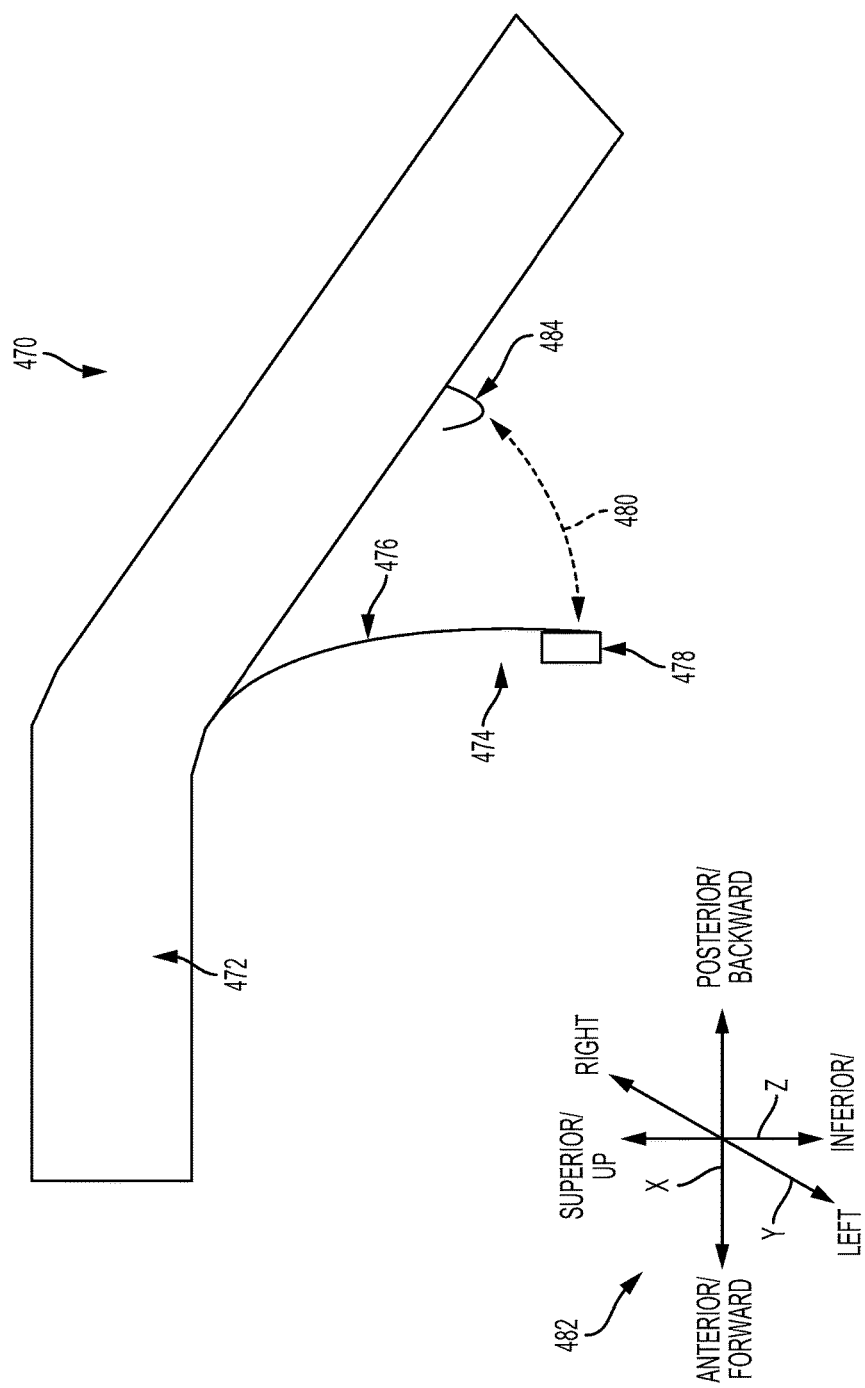
FIG. 4E illustrates a simplified block diagram illustrating an apparatus according to an example embodiment

FIG. 3 is a block diagram showing basic components of a computing device 310 and a wearable computing device 330, according to an example embodiment. In an example configuration, computing device 310 and wearable computing device 330 are operable to communicate via a communication link 320 (e.g., a wired or wireless connection). Computing device 310 may be any type of device that can receive data and display information corresponding to or associated with the data. For example, the computing device 310 may be a mobile phone, a tablet computer, a laptop computer, a desktop computer, or an in-car computer, among other possibilities. Wearable computing device 330 may be a wearable computing device such as those described in reference to FIGS. 1A, 1B, 2A, 2B, and 2C, a variation on these wearable computing devices, or another type of wearable computing device altogether.

The wearable computing device 330 and computing device 310 include hardware and/or software to enable communication with one another via the communication link 320, such as processors, transmitters, receivers, antennas, etc. In the illustrated example, computing device 310 includes one or more communication interfaces 311, and wearable computing device 330 includes one or more communication interfaces 331. As such, the wearable computing device 330 may be tethered to the computing device 310 via a wired or wireless connection. Note that such a wired or wireless connection between computing device 310 and wearable computing device 330 may be established directly (e.g., via Bluetooth), or indirectly (e.g., via the Internet or a private data network).

In a further aspect, note that while computing device 310 includes a graphic display system 316, the wearable computing device 330 does not include a graphic display. In such a configuration, wearable computing device 330 may be configured as a wearable audio device, which allows for advanced voice control and interaction with applications running on another computing device 310 to which it is tethered.

As noted, communication link 320 may be a wired link, such as a universal serial bus or a parallel bus, or an Ethernet connection via an Ethernet port. A wired link may also be established using a proprietary wired communication protocol and/or using proprietary types of communication interfaces. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

As noted above, to communicate via communication link 320, computing device 310 and wearable computing device 330 may each include one or more communication interface(s) 311 and 331 respectively. The type or types of communication interface(s) included may vary according to the type of communication link 320 that is utilized for communications between the computing device 310 and the wearable computing device 330. As such, communication interface(s) 311 and 331 may include hardware and/or software that facilitates wired communication using various different wired communication protocols, and/or hardware and/or software that facilitates wireless communications using various different wired communication protocols.

Computing device 310 and wearable computing device 330 include respective processing systems 314 and 324. Processors 314 and 324 may be any type of processor, such as a micro-processor or a digital signal processor, for example. Note that computing device 310 and wearable computing device 330 may have different types of processors, or the same type of processor. Further, one or both of computing device 310 and a wearable computing device 330 may include multiple processors.

Computing device 310 and a wearable computing device 330 further include respective on-board data storage, such as memory 318 and memory 328. Processors 314 and 324 are communicatively coupled to memory 318 and memory 328, respectively. Memory 318 and/or memory 328 (any other data storage or memory described herein) may be computer-readable storage media, which can include volatile and/or non-volatile storage components, such as optical, magnetic, organic or other memory or disc storage. Such data storage can be separate from, or integrated in whole or in part with one or more processor(s) (e.g., in a chipset).

Memory 318 can store machine-readable program instructions that can be accessed and executed by the processor 314. Similarly, memory 328 can store machine-readable program instructions that can be accessed and executed by the processor 324.

In an exemplary embodiment, memory 318 may include program instructions stored on a non-transitory computer-readable medium and executable by the at least one processor to provide a graphical user-interface (GUI) on a graphic display 316. The GUI may include a number of interface elements to adjust lock-screen parameters of the wearable computing device 330 and the computing device 310. These interface elements may include: (a) an interface element for adjustment of an unlock-sync feature, wherein enabling the unlock-sync feature causes the wearable audio device to operate in an unlocked state whenever the master device is in an unlocked state, and wherein disabling the unlock-sync feature allows the wearable audio device to operate in a locked state when the master device is in an unlocked state, and (b) an interface element for selection of a wearable audio device unlock process, wherein the selected wearable audio device unlock process provides a mechanism to unlock the wearable audio device, independent from whether the master device is in the locked state or the unlocked state.

In a further aspect, a communication interface 311 of the computing device 310 may be operable to receive a communication from the wearable audio device that is indicative of whether or not the wearable audio device is being worn. Such a communication may be based on sensor data generated by at least one sensor of the wearable audio device. As such, memory 318 may include program instructions providing an on-head detection module. Such program instructions may to: (i) analyze sensor data generated by a sensor or sensors on the wearable audio device to determine whether or not the wearable audio device is being worn; and (ii) in response to a determination that the wearable audio device is not being worn, lock the wearable audio device (e.g., by sending a lock instruction to the wearable audio device).

III. EXEMPLARY BONE-CONDUCTION EAR-PIECES

A. Exemplary Positioning of Bone-Conduction Speaker

FIG. 4 is a simplified block diagram illustrating an apparatus 400 according to an example embodiment. In particular, FIG. 4 shows a portion of a side-arm 402 from a glasses-style support structure. Further, a moveable ear-piece 404 is attached to side-arm 402. The moveable ear-piece 404 is generally formed by a moveable member 406 and a bone-conduction speaker 408. As shown, the proximate end of the moveable member 406 is attached to the support structure. Further, as shown, the bone-conduction speaker 408 is attached at or near the distal end of the moveable member 406.

FIG. 4 illustrates directional axes 412 in order to provide a frame of reference for the movement of moveable ear-piece. In particular, the axes 412 include an x-axis, which generally aligns with the anterior-posterior axis when the glasses-style support structure is worn. As such, forward movement of bone-conduction speaker 408 may be referred to as movement to the anterior and backward movement of bone-conduction speaker 408 may be referred to as movement to the posterior. Axes 412 also include a z-axis, which indicates the general direction of upward and downward movement and generally aligns with the superior-inferior axis when the glasses-style support structure is worn. Further, axes 412 include a y-axis, which indicates the general direction of left and right movement and generally aligns with the medio-lateral axis when the glasses-style support structure is worn.

As further shown, member 406 extends to the anterior of the side-arm 402. Configured as such, when the glasses-style support structure is worn, the distal end of the member 406 positions the bone-conduction speaker 408 to the posterior of the ear. The bone-conduction speaker 408 may be moveable forwards and backwards from the side-arm 402 (i.e., towards and away from the posterior of the ear, respectively) such that when the support structure is worn, the bone-conduction speaker 408 faces a posterior surface of the ear.

More specifically, in an example embodiment, member 406 may be moveable such that the distal end, to which bone conduction speaker 408 is attached, is moveable through arc 410. Note that the range of movement for the bone-conduction speaker along arc 410 may generally have a downward component and a component towards the anterior, and therefore may be generally parallel to a sagittal plane when worn. However, it should be understood that when an exemplary HMD is worn, the movement of the bone conduction speaker might vary from being exactly parallel to the sagittal plane (e.g., having a slight y-axis (left-right) component, in addition to an x-axis (anterior-posterior) component and/or a y-axis (superior-inferior) component), without departing from the scope of the invention.

As such, the member 406 may be configured to position bone-conduction speaker 408 such that bone-conduction speaker 408 contacts the posterior of the ear. Further, in an exemplary embodiment, the member 406 and bone-conduction speaker 408 may be arranged such that the bone-conduction speaker 408 contacts the posterior of the ear at or near the auricle. However, the bone-conduction speaker 408 may contact another posterior surface or surfaces without departing from the scope of the invention.

In some embodiments, ear-piece 404 may be spring-loaded. For instance, a spring-loaded member may be implemented with spring steel. In the illustrated embodiment, member 406 is a curved cantilever spring that tends to return a curved shape. For example, the natural position of member 404 and bone-conduction speaker 408 may be that shown in FIG. 4. Therefore, when a wearer puts on the glasses-style support structure, the back of the ear may contact bone-conduction speaker 408 and cause the member 406 to move to the posterior along an arc 410. Then, when the wearer takes the glasses-style support structure off, member 406 and bone-conduction speaker 408 may return to their natural position.

In an exemplary embodiment, the curvature of member 406 may be such that when the wearer puts the glasses on, the tendency of the cantilever spring to return to its natural curved shape will press the bone-conduction speaker against the posterior of the ear.

VI. EXEMPLARY DAMPING INTEGRATION

Figure 5:
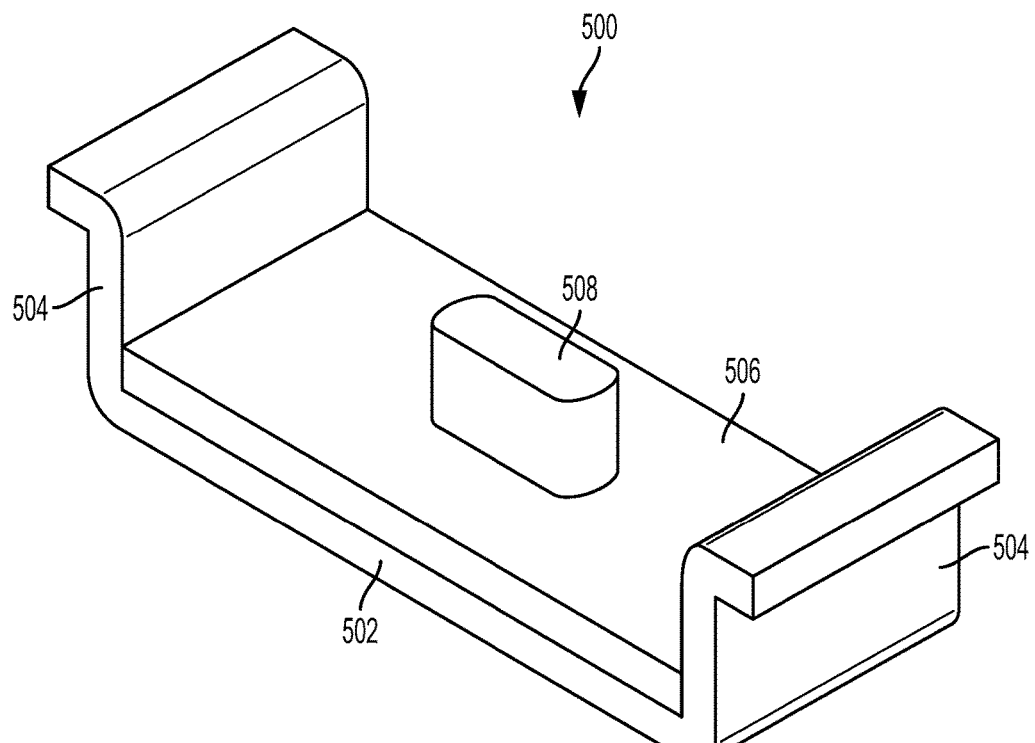
FIG. 5 illustrates block diagram showing components of a damping steel according to an example embodiment.

FIG. 5 illustrates a simplified cross section view showing the different layers of damping steel 500. Damping steel 500 is a material that integrates a rubber and/or polymer layer within metallic layers. In one example, damping steel may be implemented with Quiet Steel®, which is produced by Material Sciences Corporation. Damping steel may generally be composed of three main layers. The outer layers 502 may be steel and the middle layer 504 may be visco-elastic core. An adhesive 506 may bond the three layers 502, 504 together. The adhesive 506 may be a pressure sensitive adhesive that may have electrical conductive properties. The damping steel 500 may further be coated on the outer surfaces using various coatings 508. The coatings may include e-coat, pre-paint, or phosphate.

Figure 6:
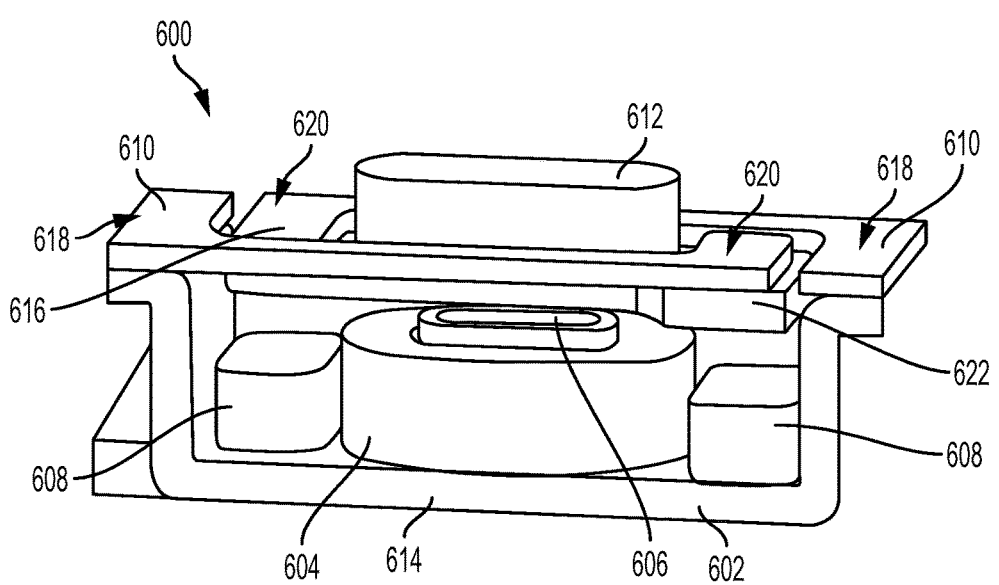
FIG. 6 illustrates a bone conduction transducer according to an example embodiment.

FIG. 6 illustrates an exemplary BCT 600. The BCT 600 may include a yoke 602 at the base of the BCT 600. The yoke 602 may be a "U" shaped component with a flat base section 614 and arms 616 that are perpendicular to the base section. The BCT 600 further may include a coil section 604. The coil section 604 may be formed by metallic wires that are wound around a core post 606 attached to the yoke 602. The coil 604 is flanked on both sides by permanent magnets 608 that are also attached to the flat base section of the yoke 602. The yoke 602 may be coupled to two separate springs 610, which are each attached to each of the one of the arms of the yoke 602. As shown in FIG. 6, the springs 610 may also be "U" shaped. As such, each spring may be arranged such that: (a) a first portion of the spring is attached to one of the arms 616 of the yoke 602, (b) a second portion of the spring extends inwards towards the center of the BCT 600, in a plane that is substantially parallel of the flat base section 614 of the yoke 602, and (c) a third portion of the spring curves in before it reaches the other arm 616 of the yoke 602, such that it is proximate to the first portion of the other spring.

The second and third portions of the springs 610 may be coupled to an anvil 612. The anvil 612 may have a flat section that provides attachment points with the springs 610 and a raised section that extends through an opening formed between the springs 610.

To operate a BCT, an electrical signal representing an audio signal may be fed through a wire coil. The audio signal in the coil induces a magnetic field that is time-varying. The induced magnetic field varies proportionally to the audio signal applied to the coil. The magnetic field induced by coil may cause a ferromagnetic core post 606 to become magnetized. The core post 606 may be any ferromagnetic material such as iron, nickel, cobalt, or rare earth metals. In some embodiments, the core post 606 may be physically connected to the yoke, like as shown in FIG. 6. In other embodiments, the core may be physically connected to the diaphragm (the physical connection is not shown). Additionally, in various embodiments the core post 606 is a magnet. The diaphragm is configured to vibrate based on magnetic field induced by coil. The diaphragm may be made of a metal or other metallic substance. When an electrical signal propagates through coil it will induce a magnetic field in the core post 606. This magnetic field will couple to the diaphragm and cause diaphragm to responsively vibrate.

Each of the support arms 616 includes a leaf spring extension 610 terminating at one end with a frame mount end 618, and terminating at the opposite end with an overlapping diaphragm connection. On the first support arm, the leaf spring extension 610 can be formed of a metal, plastic, and/or composite material and has an approximately rectangular cross-section with a height smaller than its width. For example, the approximately rectangular cross section can have rounded corners between substantially straight edges, or can be a shape that lacks straight edges, such as an ellipse or oval with a height smaller than its width. Due to the smaller height, the support arm flexes more readily in a direction transverse to its cross-sectional height than its width, such that the support arm provides flexion (i.e., movement) in a direction substantially transverse to its cross-sectional height, without allowing significant movement in a direction transverse to its cross-sectional width.

In some embodiments, the cross-sectional height and/or width of the support arms 616 can vary along the length of the support arms 616 in a continuous or non-continuous manner such that the support arms 616 provide desired flexion. For example, the cross-sectional height and/or width of the support arms 616 can be gradually tapered across their respectively lengths to provide a change in thickness from one end to the other (e.g., a variation in thickness of 10%, 25%, 50%, etc.). In another example, the cross-sectional height and/or width of the support arms 616 can be relatively small near their respective mid-sections in comparison to their respective ends (e.g., a mid-section with a thickness and/or width of 10%, 25%, 50%, etc. less than the ends). Changes in thickness (i.e., cross-sectional height) and/or width adjust the flexibility of the support arms 616 and thereby change the frequency and/or amplitude response of the diaphragm 622.

Thus, the leaf spring extension 610 can allow the diaphragm 622 to travel toward and away from the wire coil 604 (e.g., parallel to the orientation of the core post 606), without moving substantially side-to-side (e.g., perpendicular to the orientation of the core post 606). The leaf spring extension 610 similarly allows the diaphragm 622 to elastically travel toward and away from the wire coil 604. The frame mount ends 618 can be a terminal portion of the leaf spring extensions 610 that overlaps the support arms 616 when the BCT 600 is assembled. The frame mount ends 618 are securely connected to the respective top surfaces of the support arms 616 to anchor the support arms 616 to the yoke 602. The opposite ends of the support arms 616 extend transverse to the length of the leaf spring extensions to form the overlapping diaphragm mounts. In some embodiments, the leaf spring extensions can resemble the height of an upper-case letter "L" while the respective transverse-extended overlapping diaphragm mounts resemble the base. In some embodiments, such as where the yoke 602 additionally or alternatively includes sidewalls for mounting the support arms 616, the support arms 616 can resemble an upper-case letter "C," with leaf spring extensions formed from the mid-section of the "C" and the bottom and top transverse portions providing mounting surfaces to the diaphragm 622 and the side walls, respectively.

The diaphragm 622 is situated as a rectangular plate situated perpendicular to the orientation of the electromagnet core post 606 with extending mounting surfaces. The diaphragm 622 includes an outward anvil 612 and opposite coil-facing surface, and mounting surfaces extending outward from the anvil 612. The mounting surfaces can be in a parallel plane to the anvil 612, with both in a plane approximately perpendicular to the orientation of the core post 606. The mounting surfaces 620 interface with the overlapping diaphragm mounts to elastically suspend the diaphragm 622 over the electromagnetic coil 604.

In some embodiments, the anvil 612 is rectangular and oriented in approximately the same direction as the base platform of the yoke 602. The mounting surfaces can optionally project along the length of the rectangular diaphragm 622 to underlap the transverse-extended overlapping diaphragm mounts of the support arms 616. The mounting surfaces can optionally project along the width of the rectangular diaphragm 622 to allow the support arms 616 to overlap the mounting surfaces on a portion of the leaf-spring extensions in addition to the transverse-extended overlapping diaphragm mounts. In some examples, the anvil 612 may also include a non-metallic (such as a plastic) component coupled to its top surface (not shown). The non-metallic component may act as an interface between the device and a human to couple the vibrations of the anvil to the human.

Furthermore, the two support arms 616 are connected to opposite ends of the diaphragm 622 (via the overlapping diaphragm mounts) so as to balance torque generated on the diaphragm 622 by the individual support arms 616. That is, each of the support arms 616 are connected to the diaphragm 622 away from its center-point, but at opposing locations of the diaphragm 622 so as to balance the resulting torque on the diaphragm 622.

When assembled, the first support arm is connected to the yoke 602 at one end via the first strut, and the leaf spring extension is projected adjacent the length of the diaphragm 622. The overlapping diaphragm mount of the first support arm connects to the diaphragm 622 at the mounting surface. One edge of the mounting surface is situated adjacent the second strut, but the opposite end can extend along the width of the diaphragm 622 to underlap the overlapping diaphragm mount. Similarly, the second support arm is connected to the yoke 602 at one end via the second strut, and the leaf spring extension is projected adjacent the length of the diaphragm 622. The overlapping diaphragm mount of the first support arm connects to the diaphragm 622 at the mounting surface. One edge of the mounting surface is situated adjacent the first strut, but the opposite end can extend along the width of the diaphragm 622 to underlap the overlapping diaphragm mount. To allow for movement of the diaphragm 622 via flexion of the leaf spring extensions of the support arms 616, each of the support arms 616 and the diaphragm 622 are free of motion-impeding obstructions with the yoke 602, wire coil 604 and/or permanent magnets 608.

In operation, electrical signals are provided to the BCT 600 that are based on a source of audio content. The BCT 600 is situated in a wearable computing device such that the vibrations of the diaphragm 622 are conveyed to a bony structure of a wearer's head (to provide vibrational propagation to the wearer's inner ear). For example, with reference to FIG. 2, the processor 206 can interpret signals 212 from the remote device 214 communicating a data indicative of audio content (e.g., a digitized audio stream). The processor 206 can generate electrical signals to the wire coil 604 to create a time-changing magnetic field sufficient to vibrate the diaphragm 622 to create vibrations in the wearer's inner ear corresponding to the original audio content. For example, the electrical signals can drive currents in alternating directions through the wire coil 604 so as to create a time-changing magnetic field with a frequency and/or amplitude sufficient to create the desired vibrations for perception in the inner ear.

The diaphragm 622 can optionally include mounting points, such as, for example, threaded holes, to allow for securing an anvil to the BCT 600. For example, an anvil with suitable dimensions and/or shape for coupling to a bony portion of a head can be mounted to the anvil 612 of the diaphragm 622. The mounting points thereby allow for a single BCT design to be used with multiple different anvils, such as some anvils configured to contact a wearer's temple, and others configured to contact a wearer's mastoid bone, etc. It is noted that other techniques may be used to connect the diaphragm 622 to an anvil, such as adhesives, heat staking, interference fit ("press fit"), insert molding, welding, etc. Such connection techniques can be employed to provide a rigid bond between a diaphragm 622 and the anvil 612 such that vibrations are readily transferred from the diaphragm 622 to the anvil 612 and not absorbed in such bonds. In some examples, the diaphragm 622 can be integrally formed with a suitable anvil, such as where a vibrating surface of the diaphragm 622 is exposed to be employed as an anvil for vibrating against a bony portion of the wearer's head.

In some embodiments of the present disclosure, the support arms 616 are cantilevered along the length of the diaphragm 622 (i.e., along the longest dimension of the approximately rectangular plate forming the anvil 612). One end of the cantilevered support arm is connected to the yoke 602 via the strut near one side of the diaphragm 622, and the opposite end of the support arm is connected to the diaphragm 622 near the opposite end of the diaphragm 622 via the support surface and the overlapping diaphragm mount. Similarly, one end of the cantilevered support arm is connected to the yoke 602 via the strut near one side of the diaphragm 622, and the opposite end of the support arm is connected to the diaphragm 622 near the opposite end of the diaphragm 622 via the support surface and the overlapping diaphragm mount. Thus, the two support arms 616 cross one another on opposite sides of the diaphragm 622 to balance the torque on the diaphragm 622, with one extending adjacent one side of the diaphragm 622, the other extending along the opposite side of the diaphragm 622.

It is noted that the BCT 600 shows the connection between the support arms 616 and the diaphragm 622 with the support arms 616 overlapping the diaphragm 622 (e.g., at the overlapping diaphragm mounts). However, a secure mechanical connection between the support arms 616 and the diaphragm 622 can also be provided by arranging the diaphragm 622 to overlap the support arms 616. In such case, the support arms 616 can optionally be lowered by an amount approximately equal to the thickness of the diaphragm mounting surfaces to achieve a comparable separation between the diaphragm 622 lower surface and the electromagnetic coil 604.

Figure 7:
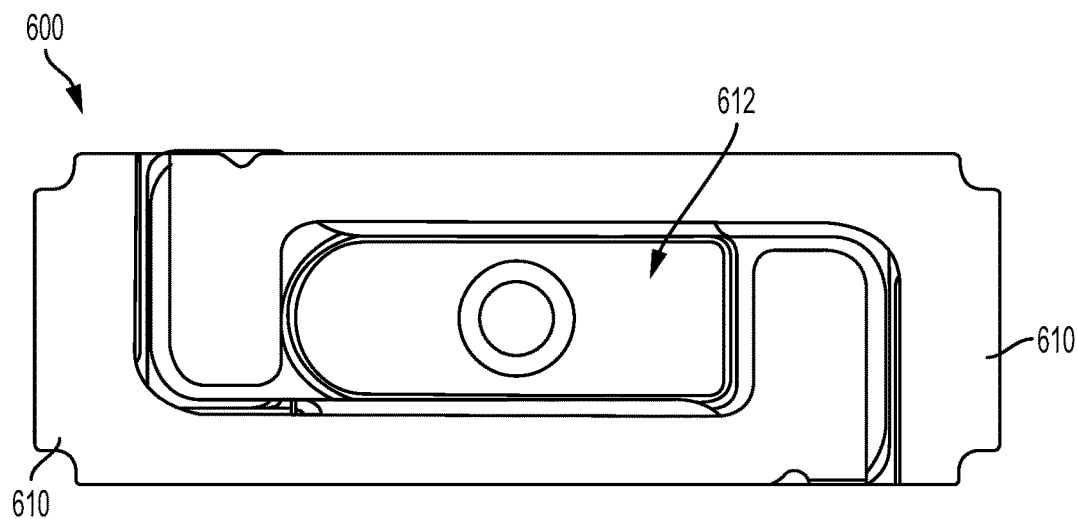
FIG. 7 illustrates a bone conduction transducer according to an example embodiment.

FIG. 7 illustrates a top view of the exemplary BCT 600 described above. The springs 610 which are manufactured using damping steel may be "U" shaped and both may be arranged such that there is a central opening through which the raised section of the anvil is located.

Figure 8:
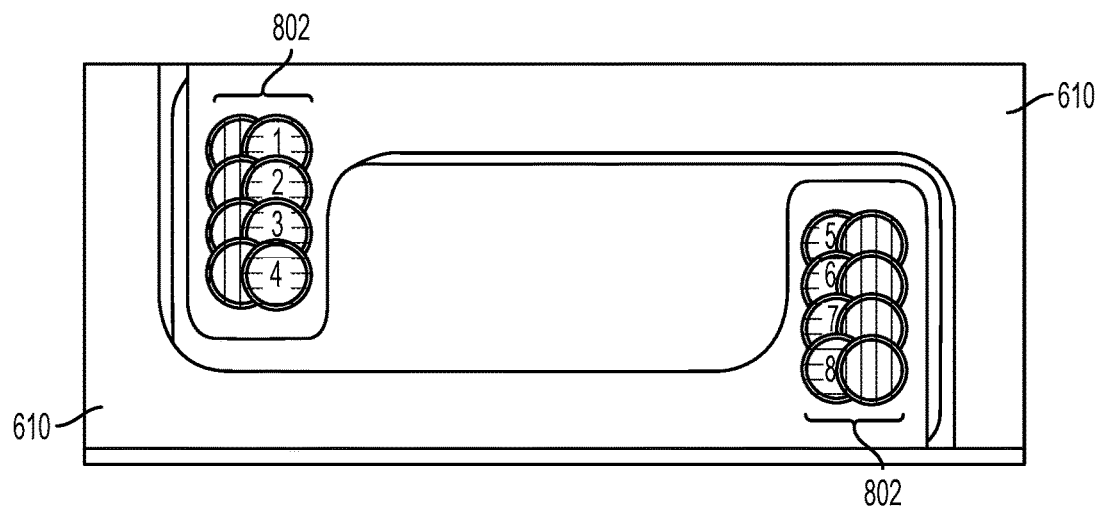
FIG. 8 illustrates welding points according to an example embodiment.

FIG. 8 illustrates welding points for attaching the anvil (not shown) 612 to the springs 610. As described above, the anvil 612 may be attached to the springs 610. Specifically, the flat section of the anvil 612 may be attached to the springs 610.

In one embodiment, the anvil 612 and the springs 610 may be attached together using laser welding techniques. In some examples, the bonding force between the anvil 612 and the springs 610 may not exceed 25 Newtons. An set of welding parameter may include: (i) the welding process may be a diode optic laser weld; (ii) the thickness of the weld may range between 0.4 millimeters (mm) to 0.7 mm; (iii) the laser may be a diode-based laser; (iv) the laser may be a continuous wave laser; (v) the wavelength of the laser may be 1030 nanometers (nm); (vi) the laser may have a power of 600 watts; (vii) the laser may have a 280 mm focal length; (viii) the weld may be performed at approximately 1905 mm/second; (ix) the laser may have a gas configured with 90% argon and 10% helium; (x) the laser may have a gas flow of 16.6 liters/second; (xi) the laser may have a gas nozzle diameter of 6.35 mm, and (xii) the laser may have a copper heatsink.

In another embodiment, there may be eight weld points 802 bonding the anvil 612 is attached to one of the springs 610. The weld points 802 may consist of two parallel lines, each line may include four weld points. In some embodiments, the parallel lines may overlap each other.

Figure 9:
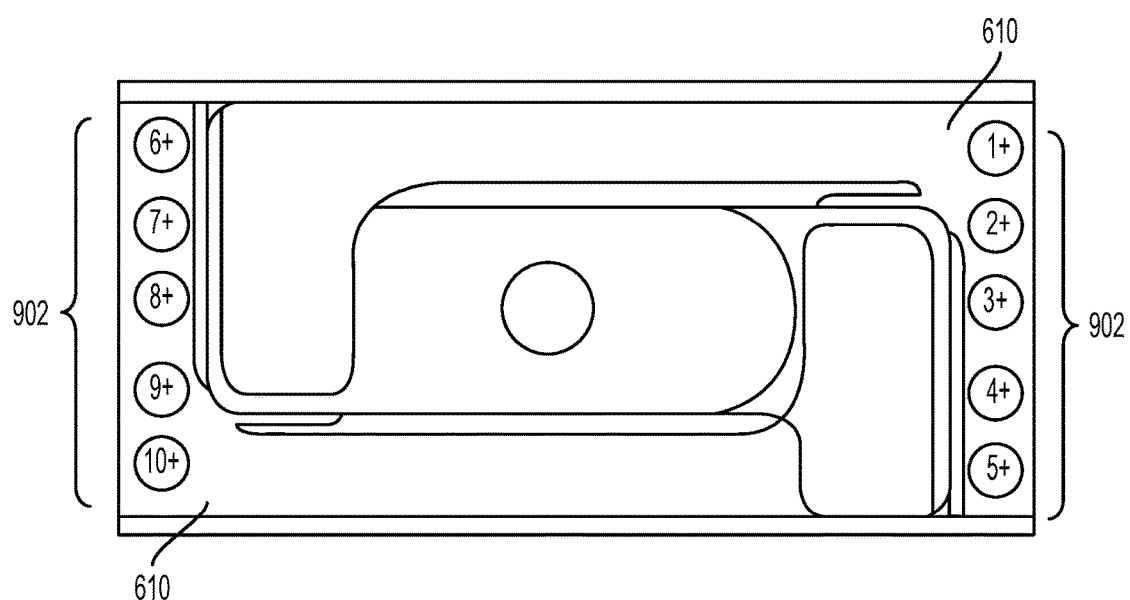
FIG. 9 illustrates welding points according to an example embodiment.

FIG. 9 illustrates welding points for attaching the springs 610 to the arms of the yoke 602, according to one example embodiment. As shown in FIG. 9, the first end of the spring 610 may be attached to the arm of the yoke 602. Further, the first end of the spring 610 and yoke 603 may be welded together using laser welding techniques, similar to those previously described. In some embodiments, there may be five welding points 902 across a surface of one end of the arm of the yoke 602. The five welding points 902 are arranged in a straight line that extends through the entire length of a contact surface where the first end of the spring 610 and the surface of one end of the arm of the yoke 602 come in contact. The bonding force on the spring 610 and the yoke 602 may not exceed 75 Newtons. The other spring 610 may be attached to the yoke using the same welding locations and parameters.

Use of damping steel in a BCT may present a number of advantages. One advantage of using damping steel is that the damping steel may reduce resonant vibrations of the BCT. During the operation of the BCT, the resonant vibrations caused by the operation of the device at or near a resonant frequency of the device may cause a buzzing and/or irritation sensation experienced by the user. Therefore, the use of damping steel may cause a more pleasurable user experience for the BCT device. This may be from the improved damping characteristics of the damping steel. As previously discussed, the damping steel may reduce resonant vibrations by either shifting the resonant frequency of the springs and/or reducing the amplitude of vibrations caused by resonance. In addition, integrating damping steel into the BCT allows the BCT packaging to be compact as no additional dampers such as a rubber damper need to be additionally integrated into the BCT.

VI. EXEMPLARY DAMPING INTEGRATION

Figure 10:
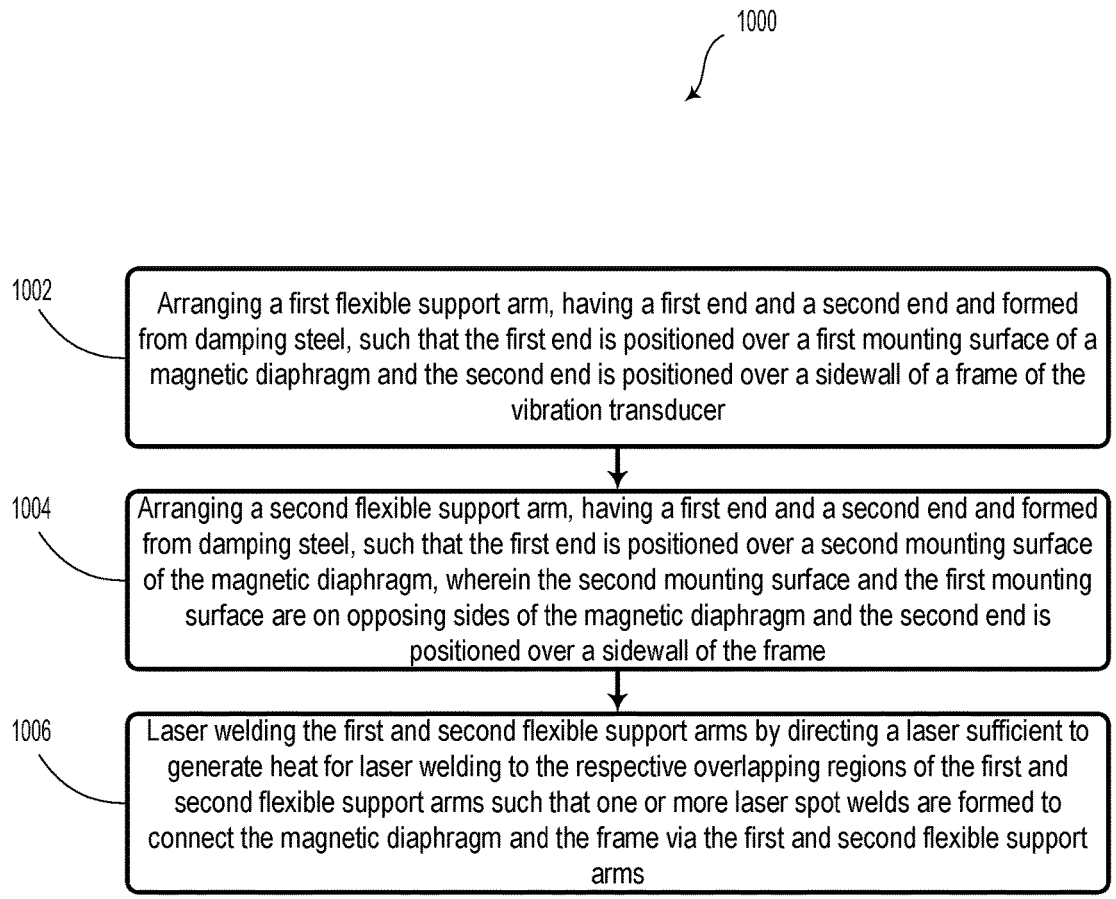
FIG. 10 illustrates a method, according to an example embodiment.

FIG. 10 illustrates a method 1000 of assembling a vibration transducer, according to an example embodiment. Method 1000 may describe elements and/or operating modes similar or identical to those illustrated and described in reference to FIGS. 1, 2A-C, 3, 4A-E, 5, 6, 7, 8, and 9. While FIG. 10 illustrates a certain steps or blocks, it is understood that other steps or blocks are possible. Specifically, blocks or steps may be added or subtracted. Additionally or alternatively, blocks or steps may be repeated, interchanged, and/or carried out in a different order than illustrated herein.

Block 1002 includes arranging a first flexible support arm, having a first end and a second end, such that the first end is positioned over a first mounting surface of a magnetic diaphragm and the second end is positioned over a sidewall of a frame of the vibration transducer. Overlapping regions of the first and second ends of the first flexible support arm overlap the first mounting surface of the magnetic diaphragm and the first sidewall of the frame, respectively.

Block 1004 includes arranging a second flexible support arm, having a first end and a second end, such that the first end is positioned over a second mounting surface of the magnetic diaphragm, wherein the second mounting surface and the first mounting surface are on opposing sides of the magnetic diaphragm and the second end is positioned over a sidewall of the frame. Overlapping regions of the first and second ends of the second flexible support arm overlap the second mounting surface of the magnetic diaphragm and the sidewall of the frame, respectively.

Block 1006 includes laser welding the first and second flexible support arms by directing a laser sufficient to generate heat for laser welding to the respective overlapping regions of the first and second flexible support arms such that one or more laser spot welds are formed to connect the magnetic diaphragm and the frame via the first and second flexible support arms configured to suspend the magnetic diaphragm with respect to the frame. The laser welding may result in a bonding force between the anvil and the springs that may not exceed 25 Newtons. An set of welding parameter may include: (i) the welding process may be a diode optic laser weld; (ii) the thickness of the weld may range between 0.4 millimeters (mm) to 0.7 mm; (iii) the laser may be a diode-based laser; (iv) the laser may be a continuous wave laser; (v) the wavelength of the laser may be 1030 nanometers (nm); (vi) the laser may have a power of 600 watts; (vii) the laser may have a 280 mm focal length; (viii) the weld may be performed at approximately 1905 mm/second; (ix) the laser may have a gas configured with 90% argon and 10% helium; (x) the laser may have a gas flow of 16.6 liters/second; (xi) the laser may have a gas nozzle diameter of 6.35 mm, and (xii) the laser may have a copper heatsink. There may be eight weld points bonding the anvil to one of the springs. The weld points may consist of two parallel lines, each line may include four weld points. In some embodiments, the parallel lines may overlap each other.

Further, as previously discussed, there may be five welding points across a surface of one end of the arm of the yoke. The five welding points are arranged in a straight line that extends through the entire length of a contact surface where the first end of the spring and the surface of one end of the arm of the yoke come in contact. The other spring may be attached to the yoke using the same welding locations and parameters.

VII. CONCLUSION

It should be understood that any examples described with reference to a "wearable audio device" may apply equally to audio devices that are not configured to be wearable, so long as such audio devices can be communicatively coupled (e.g., tethered) to another computing device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A bone-conduction transducer comprising:
an electromagnet including a conductive coil, wherein the conductive coil is configured to be driven by an electrical input signal to generate magnetic fields;
a magnetic diaphragm that is configured to mechanically vibrate in response to the generated magnetic fields; and
a pair of cantilevered arms formed from damping steel, having at least one polymer layer and one metal layer, configured to reduce vibration near a resonance frequency, wherein the pair of cantilevered arms couple the magnetic diaphragm to a frame, wherein the magnetic diaphragm vibrates with respect to the frame when the electromagnet is driven by the electrical input signal, and wherein the pair of cantilevered arms are connected to opposing sides of the magnetic diaphragm.

2. The transducer according to claim 1, further comprising an anvil coupled to the magnetic diaphragm, wherein the anvil is configured to couple a vibration of the magnetic diaphragm to a wearer of the transducer.

3. The transducer according to claim 1, wherein the pair of cantilevered arms each include an extended leaf spring with an approximately rectangular cross-section having a width greater than a height such that each cantilevered arm flexes transverse to its cross-sectional height during vibration of the magnetic diaphragm.

4. The transducer according to claim 1, wherein the frame of the transducer includes a first side and a second side opposite the first side;
wherein a first one of the pair of cantilevered arms extends from the frame at a location proximate the first side, to a side of the magnetic diaphragm proximate the second side; and
wherein a second one of the pair of cantilevered arms extends from the frame at a location proximate the second side, to a side of the magnetic diaphragm proximate the first side.

5. The transducer according to claim 4, wherein the pair of cantilevered arms are connected to the magnetic diaphragm via respective mounting plates overlapping portions of the magnetic diaphragm protruding from opposing sides of the magnetic diaphragm, wherein the mounting plates each extend transverse to a flexible portion of the respective cantilevered arms arranged adjacent the respective opposing sides of the magnetic diaphragm free of connection to either of the pair of cantilevered arms.

6. The transducer according to claim 4, wherein the first side and the second side of the frame are opposing sides bounding a longest dimension of the transducer, such that the pair of cantilevered arms extend along the longest dimension of the transducer.

7. The transducer according to claim 4, wherein each of the cantilevered arms are connected to the frame via struts or sidewalls protruding from the frame in a direction parallel an axis of the electromagnet.

8. The transducer according to claim 1, further comprising:
first and second permanent magnets arranged with substantially parallel magnetic axes and connected to the frame on opposing sides of the electromagnet to provide a magnetic bias force on the magnetic diaphragm.

9. The transducer according to claim 1, wherein the pair of cantilevered arms are non-magnetic.

10. The transducer according to claim 1, wherein the pair of cantilevered arms are coupled to at least one of the frame or the magnetic diaphragm via one or more laser weld spots.

11. A wearable computing system comprising:
a support structure, wherein one or more portions of the support structure are configured to contact a wearer;
an audio interface for receiving an audio signal; and
a vibration transducer including:
an electromagnet including a conductive coil, wherein the conductive coil is configured to be driven by an electrical input signal to generate magnetic fields;
a magnetic diaphragm that is configured to mechanically vibrate in response to the generated magnetic fields; and
a pair of cantilevered arms formed from damping steel, having at least one polymer layer and one metal layer, configured to reduce vibration near a resonance frequency, wherein the pair of cantilevered arms couple the magnetic diaphragm to a frame, wherein the magnetic diaphragm vibrates with respect to the frame when the electromagnet is driven by the electrical input signal, and wherein the pair of cantilevered arms are connected to opposing sides of the magnetic diaphragm.

12. The wearable computing system according to claim 11, wherein the support structure includes a frame with side-arms configured to rest on ears of the wearer and a nose bridge configured to rest a nose of the wearer.

13. The wearable computing system according to claim 11, wherein the one or more portions of the support structure are configured to contact the wearer via at least one of: a location on a back of an ear of the wearer, a location on a front of the ear of the wearer, a location near a temple of the wearer, a location on or above a nose of the wearer, or a location near an eyebrow of the wearer.

14. The wearable computing system according to claim 13, further comprising an anvil coupled to the magnetic diaphragm, wherein the anvil is configured to contact the wearer.

15. The wearable computing system according to claim 11, wherein the pair of cantilevered arms each include an extended leaf spring with an approximately rectangular cross-section having a width greater than a height such that each cantilevered arm flexes transverse to its cross-sectional height during vibration of the magnetic diaphragm.

16. The wearable computing system according to claim 11, wherein the pair of cantilevered arms are coupled to at least one of the frame or the magnetic diaphragm via one or more laser weld spots.

* * * * *